(12) United States Patent  
Cohen et al.

(10) Patent No.: US 10,880,541 B2  
(45) Date of Patent: *Dec. 29, 2020

(54) STEREO CORRESPONDENCE AND DEPTH SENSORS

(71) Applicant: Adobe Inc., San Jose, CA (US)

(72) Inventors: Scott D. Cohen, Sunnyvale, CA (US); Brian L. Price, Pleasant Grove, UT (US); Gowri Sornanath, Newark, DE (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,883

(22) Filed: Aug. 27, 2019

(65) Prior Publication Data

US 2020/0007855 A1  Jan. 2, 2020

Related U.S. Application Data

(62) Division of application No. 13/690,724, filed on Nov. 30, 2012, now Pat. No. 10,455,219.

(51) Int. Cl.
  *H04N 13/271* (2018.01)
  *G06T 7/593* (2017.01)
  (Continued)

(52) U.S. Cl.
  CPC .......... *H04N 13/271* (2018.05); *G06T 7/593* (2017.01); *H04N 13/122* (2018.05);
  (Continued)

(58) Field of Classification Search
  CPC .. H04N 13/271; H04N 13/122; H04N 13/239; G06K 9/4604; G06T 7/593
  (Continued)

(56) References Cited

U.S. PATENT DOCUMENTS 4,550,425 A   10/1985  Andersen et al.
4,591,928 A    5/1986  Bloom et al.
(Continued)

FOREIGN PATENT DOCUMENTS

EP   1008112       3/2005
WO   WO-2010086317  8/2010

OTHER PUBLICATIONS

"Adobe Audition 3.0 User Guide", 2007, 194 pages.
(Continued)

*Primary Examiner* — Thai Q Tran  
*Assistant Examiner* — Syed Y Hasan  
(74) *Attorney, Agent, or Firm* — SBMC

(57) ABSTRACT

Stereo correspondence and depth sensor techniques are described. In one or more implementations, a depth map generated by a depth sensor is leveraged as part of processing of stereo images to assist in identifying which parts of stereo images correspond to each other. The depth map, for instance, may be utilized to assist in identifying depth discontinuities in the stereo images. Additionally, techniques may be employed to align the depth discontinuities identified from the depth map to image edges identified from the stereo images. Techniques may also be employed to suppress image edges that do not correspond to the depth discontinuities of the depth map in comparison with image edges that do correspond to the depth discontinuities as part of the identification.

20 Claims, 14 Drawing Sheets

(51) Int. Cl.
  *H04N 13/122* (2018.01)
  *G06F 3/0346* (2013.01)
  *H04N 13/239* (2018.01)
  *H04N 13/00* (2018.01)

(52) U.S. Cl.
  CPC .. *G06F 3/0346* (2013.01); *G06T 2207/10012* (2013.01); *G06T 2207/10028* (2013.01); *H04N 13/239* (2018.05); *H04N 2013/0081* (2013.01)

(58) Field of Classification Search
  USPC .................................. 348/47; 382/154, 199
  See application file for complete search history.

(56) References Cited

U.S. PATENT DOCUMENTS

| | | |
|---|---|---|
| 5,151,998 A | 9/1992 | Capps |
| 5,301,109 A | 4/1994 | Landauer et al. |
| 5,305,420 A | 4/1994 | Nakamura et al. |
| 5,325,298 A | 6/1994 | Gallant |
| 5,418,717 A | 5/1995 | Su et al. |
| 5,490,061 A | 2/1996 | Tolin et al. |
| 5,510,981 A | 4/1996 | Berger et al. |
| 5,583,977 A | 12/1996 | Seidl |
| 5,642,522 A | 6/1997 | Zaenen et al. |
| 5,652,828 A | 7/1997 | Silverman |
| 5,671,283 A | 9/1997 | Michener et al. |
| 5,710,562 A | 1/1998 | Gormish et al. |
| 5,717,818 A | 2/1998 | Nejime et al. |
| 5,802,525 A | 9/1998 | Rigoutsos |
| 5,808,616 A | 9/1998 | Shimizu |
| 5,842,204 A | 11/1998 | Andrews et al. |
| 5,867,592 A * | 2/1999 | Sasada ............... G06K 9/00201 382/154 |
| 5,950,194 A | 9/1999 | Bennett et al. |
| 6,122,375 A | 9/2000 | Takaragi et al. |
| 6,208,348 B1 | 3/2001 | Kaye |
| 6,266,412 B1 | 7/2001 | Berenzweig et al. |
| 6,304,846 B1 | 10/2001 | George et al. |
| 6,316,712 B1 | 11/2001 | Laroche |
| 6,333,983 B1 | 12/2001 | Enichen |
| 6,353,824 B1 | 3/2002 | Boguraev et al. |
| 6,370,247 B1 | 4/2002 | Takaragi et al. |
| 6,442,524 B1 | 8/2002 | Ecker et al. |
| 6,480,957 B1 | 11/2002 | Liao et al. |
| 6,687,671 B2 | 2/2004 | Gudorf et al. |
| 6,750,873 B1 | 6/2004 | Bernardini et al. |
| 6,778,667 B1 | 8/2004 | Bakhle et al. |
| 6,792,113 B1 | 9/2004 | Ansell et al. |
| 6,804,355 B1 | 10/2004 | Graunke |
| 7,003,107 B2 | 2/2006 | Ananth |
| 7,103,181 B2 | 9/2006 | Ananth |
| 7,130,467 B1 | 10/2006 | Bronder et al. |
| 7,142,669 B2 | 11/2006 | Dworkin et al. |
| 7,155,440 B1 | 12/2006 | Kronmiller et al. |
| 7,200,226 B2 | 4/2007 | Bace |
| 7,213,156 B2 | 5/2007 | Fukuda |
| 7,218,733 B2 | 5/2007 | Li et al. |
| 7,221,756 B2 | 5/2007 | Patel et al. |
| 7,224,357 B2 | 5/2007 | Chen et al. |
| 7,269,664 B2 | 9/2007 | Hutsch et al. |
| 7,269,854 B2 | 9/2007 | Simmons et al. |
| 7,350,070 B2 | 3/2008 | Smathers et al. |
| 7,400,744 B2 | 7/2008 | Nichani et al. |
| 7,412,060 B2 | 8/2008 | Fukuda |
| 7,418,100 B2 | 8/2008 | McGrew et al. |
| 7,533,338 B2 | 5/2009 | Duncan et al. |
| 7,536,016 B2 | 5/2009 | Benaloh |
| 7,594,176 B1 | 9/2009 | English |
| 7,603,563 B2 | 10/2009 | Ansell et al. |
| 7,627,479 B2 | 12/2009 | Travieso et al. |
| 7,636,691 B2 | 12/2009 | Maari |
| 7,672,840 B2 | 3/2010 | Sasaki et al. |
| 7,680,269 B2 | 3/2010 | Nicolai et al. |
| 7,693,278 B2 | 4/2010 | Hiramatsu |
| 7,715,591 B2 | 5/2010 | Owechko et al. |
| 7,757,299 B2 | 7/2010 | Robert et al. |
| 7,827,408 B1 | 11/2010 | Gehringer |
| 7,836,311 B2 | 11/2010 | Kuriya et al. |
| 7,861,312 B2 | 12/2010 | Lee et al. |
| 7,884,854 B2 | 2/2011 | Banner et al. |
| 7,924,323 B2 | 4/2011 | Walker et al. |
| 8,050,906 B1 | 11/2011 | Zimmerman et al. |
| 8,051,287 B2 | 11/2011 | Shetty et al. |
| 8,082,592 B2 | 12/2011 | Harris |
| 8,095,795 B2 | 1/2012 | Levy |
| 8,099,519 B2 | 1/2012 | Ueda |
| 8,103,505 B1 | 1/2012 | Silverman et al. |
| 8,130,952 B2 | 3/2012 | Shamoon et al. |
| 8,134,637 B2 | 3/2012 | Rossbach et al. |
| 8,184,182 B2 | 5/2012 | Lee et al. |
| 8,189,769 B2 | 5/2012 | Ramasamy et al. |
| 8,199,216 B2 | 6/2012 | Hwang |
| 8,245,033 B1 | 8/2012 | Shetty et al. |
| 8,291,219 B2 | 10/2012 | Eto |
| 8,300,812 B2 | 10/2012 | Van De Ven |
| 8,315,396 B2 | 11/2012 | Schreiner et al. |
| 8,345,976 B2 | 1/2013 | Wang et al. |
| 8,355,565 B1 * | 1/2013 | Yang ..................... G06T 7/593 382/154 |
| 8,390,704 B2 | 3/2013 | Wang et al. |
| 8,417,806 B2 | 4/2013 | Chawla et al. |
| 8,428,390 B2 | 4/2013 | Li et al. |
| 8,447,098 B1 | 5/2013 | Cohen et al. |
| 8,520,083 B2 | 8/2013 | Webster et al. |
| 8,543,386 B2 | 9/2013 | Oh et al. |
| 8,548,226 B2 | 10/2013 | Sakano et al. |
| 8,571,305 B2 | 10/2013 | Kao |
| 8,571,308 B2 | 10/2013 | Grafulla-González |
| 8,583,443 B2 | 11/2013 | Misawa |
| 8,586,847 B2 | 11/2013 | Ellis et al. |
| 8,615,108 B1 | 12/2013 | Stoppa et al. |
| 8,619,082 B1 | 12/2013 | Ciurea et al. |
| 8,694,319 B2 | 4/2014 | Bodin et al. |
| 8,731,913 B2 | 5/2014 | Zopf et al. |
| 8,738,633 B1 | 5/2014 | Sharifi et al. |
| 8,805,560 B1 | 8/2014 | Tzanetakis et al. |
| 8,855,334 B1 | 10/2014 | Lavine et al. |
| 8,879,731 B2 | 11/2014 | Schultz |
| 8,886,543 B1 | 11/2014 | Sharifi et al. |
| 8,903,088 B2 | 12/2014 | Schultz |
| 8,914,290 B2 | 12/2014 | Hendrickson et al. |
| 8,953,811 B1 | 2/2015 | Sharifi et al. |
| 9,064,318 B2 | 6/2015 | Price et al. |
| 9,076,205 B2 | 7/2015 | Cho et al. |
| 9,135,710 B2 | 9/2015 | Cohen et al. |
| 9,201,580 B2 | 12/2015 | King et al. |
| 9,208,547 B2 | 12/2015 | Cohen et al. |
| 9,214,026 B2 | 12/2015 | Price et al. |
| 9,355,649 B2 | 5/2016 | King et al. |
| 9,451,304 B2 | 9/2016 | King et al. |
| 10,249,052 B2 | 4/2019 | Cohen et al. |
| 10,249,321 B2 | 4/2019 | King et al. |
| 10,455,219 B2 | 10/2019 | Cohen et al. |
| 2002/0081019 A1 | 6/2002 | Katayama et al. |
| 2002/0086269 A1 | 7/2002 | Shpiro |
| 2002/0099547 A1 | 7/2002 | Chu et al. |
| 2002/0154779 A1 | 10/2002 | Asano et al. |
| 2003/0028380 A1 | 2/2003 | Freeland et al. |
| 2004/0030656 A1 | 2/2004 | Kambayashi et al. |
| 2004/0122656 A1 | 6/2004 | Abir |
| 2004/0122662 A1 | 6/2004 | Crockett |
| 2004/0184655 A1 | 9/2004 | Ziegler et al. |
| 2004/0254660 A1 | 12/2004 | Seefeldt |
| 2005/0015343 A1 | 1/2005 | Nagai et al. |
| 2005/0021323 A1 | 1/2005 | Li |
| 2005/0201591 A1 * | 9/2005 | Kiselewich .......... G06K 9/6293 382/104 |
| 2005/0232463 A1 | 10/2005 | Hirvonen et al. |
| 2006/0045211 A1 | 3/2006 | Oh et al. |
| 2006/0078194 A1 | 4/2006 | Fradkin et al. |
| 2006/0122839 A1 | 6/2006 | Li-Chun Wang et al. |
| 2006/0165240 A1 | 7/2006 | Bloom et al. |
| 2006/0173846 A1 | 8/2006 | Omae et al. |

(56) References Cited

U.S. PATENT DOCUMENTS

| | | |
|---|---|---|
| 2006/0221072 A1 | 10/2006 | Se et al. |
| 2007/0041663 A1 | 2/2007 | Cho et al. |
| 2007/0061145 A1 | 3/2007 | Edgington et al. |
| 2007/0070226 A1 | 3/2007 | Matusik et al. |
| 2007/0087756 A1 | 4/2007 | Hoffberg |
| 2007/0098250 A1 | 5/2007 | Molgaard et al. |
| 2007/0132763 A1 | 6/2007 | Chu et al. |
| 2007/0291958 A1 | 12/2007 | Jehan |
| 2008/0036761 A1 | 2/2008 | Mazzanti |
| 2008/0120230 A1 | 5/2008 | Lebegue et al. |
| 2008/0246757 A1 | 10/2008 | Ito |
| 2009/0055139 A1 | 2/2009 | Agarwal et al. |
| 2009/0125726 A1 | 5/2009 | Iyer et al. |
| 2009/0195643 A1 | 8/2009 | Neuman |
| 2009/0259684 A1 | 10/2009 | Knight et al. |
| 2009/0276628 A1 | 11/2009 | Cho et al. |
| 2009/0279697 A1 | 11/2009 | Schneider |
| 2009/0290710 A1 | 11/2009 | Tkachenko et al. |
| 2009/0290786 A1 | 11/2009 | Stevens et al. |
| 2009/0306972 A1 | 12/2009 | Opitz et al. |
| 2009/0307489 A1 | 12/2009 | Endoh |
| 2009/0315670 A1 | 12/2009 | Naressi et al. |
| 2010/0105454 A1 | 4/2010 | Weber |
| 2010/0153747 A1 | 6/2010 | Asnaashari et al. |
| 2010/0172567 A1 | 7/2010 | Prokoski |
| 2010/0208779 A1 | 8/2010 | Park et al. |
| 2010/0246816 A1 | 9/2010 | Thomas et al. |
| 2010/0257368 A1 | 10/2010 | Yuen |
| 2010/0279766 A1 | 11/2010 | Pliska et al. |
| 2010/0284607 A1 | 11/2010 | Van Den Hengel et al. |
| 2010/0295783 A1 | 11/2010 | El Dokor et al. |
| 2010/0322042 A1 | 12/2010 | Serletic et al. |
| 2011/0043864 A1 | 2/2011 | Tian et al. |
| 2011/0112670 A1 | 5/2011 | Disch et al. |
| 2011/0131219 A1 | 6/2011 | Martin-Cocher et al. |
| 2011/0161669 A1 | 6/2011 | Eto |
| 2011/0173208 A1 | 7/2011 | Vogel |
| 2011/0230987 A1 | 9/2011 | Anguera Miró et al. |
| 2012/0042167 A1 | 2/2012 | Marking et al. |
| 2012/0046954 A1 | 2/2012 | Lindahl et al. |
| 2012/0056982 A1 | 3/2012 | Katz et al. |
| 2012/0071239 A1 | 3/2012 | Graepel et al. |
| 2012/0130822 A1* | 5/2012 | Patwa ............... G06Q 30/0273 705/14.69 |
| 2012/0173865 A1 | 7/2012 | Swaminathan |
| 2012/0173880 A1 | 7/2012 | Swaminathan |
| 2012/0216300 A1 | 8/2012 | Vivolo et al. |
| 2012/0219229 A1 | 8/2012 | Springer et al. |
| 2012/0321172 A1 | 12/2012 | Jachalsky et al. |
| 2013/0064443 A1 | 3/2013 | Schlosser et al. |
| 2013/0113881 A1 | 5/2013 | Barnum |
| 2013/0124148 A1 | 5/2013 | Jin |
| 2013/0127824 A1 | 5/2013 | Cohen |
| 2013/0132733 A1 | 5/2013 | Agrawal et al. |
| 2013/0142330 A1 | 6/2013 | Schultz |
| 2013/0142331 A1 | 6/2013 | Schultz |
| 2013/0173273 A1 | 7/2013 | Kuntz et al. |
| 2013/0191491 A1 | 7/2013 | Kotha et al. |
| 2013/0243313 A1 | 9/2013 | Civit et al. |
| 2013/0243314 A1 | 9/2013 | Civit et al. |
| 2013/0290818 A1 | 10/2013 | Arrasvuori et al. |
| 2013/0343606 A1 | 12/2013 | Dal Mutto et al. |
| 2014/0023291 A1 | 1/2014 | Lin |
| 2014/0119643 A1 | 5/2014 | Price |
| 2014/0135962 A1 | 5/2014 | King et al. |
| 2014/0136976 A1 | 5/2014 | King et al. |
| 2014/0140626 A1 | 5/2014 | Cho |
| 2014/0142947 A1 | 5/2014 | King |
| 2014/0148933 A1 | 5/2014 | King |
| 2014/0152776 A1 | 6/2014 | Cohen |
| 2014/0153816 A1 | 6/2014 | Cohen |
| 2014/0168215 A1 | 6/2014 | Cohen |
| 2014/0169660 A1 | 6/2014 | Cohen |
| 2014/0177903 A1 | 6/2014 | Price |
| 2014/0201630 A1 | 7/2014 | Bryan |
| 2014/0310006 A1 | 10/2014 | Anguera Miro et al. |

OTHER PUBLICATIONS

"Adobe Audition", User Guide, 2003, 196 pages.
"Advisory Action", U.S. Appl. No. 13/681,643, dated Jul. 24, 2018, 3 pages.
"Corrected Notice of Allowance", U.S. Appl. No. 13/660,159, dated Apr. 28, 2015, 2 pages.
"Corrected Notice of Allowance", U.S. Appl. No. 13/660,159, dated May 29, 2015, 2 pages.
"Corrected Notice of Allowance", U.S. Appl. No. 13/688,421, dated Aug. 22, 2016, 2 pages.
"Corrected Notice of Allowance", U.S. Appl. No. 13/720,258, dated Nov. 13, 2015, 2 pages.
"Corrected Notice of Allowance", U.S. Appl. No. 13/720,316, dated Jan. 30, 2019, 4 pages.
"Corrected Notice of Allowance", U.S. Appl. No. 13/722,825, dated Sep. 21, 2015, 4 pages.
"Corrected Notice of Allowance", U.S. Appl. No. 13/722,825, dated Nov. 16, 2015, 4 pages.
"Final Office Action", U.S. Appl. No. 12/852,349, dated Sep. 13, 2013, 34 pages.
"Final Office Action", U.S. Appl. No. 12/852,349, dated Nov. 19, 2012, 28 pages.
"Final Office Action", U.S. Appl. No. 13/309,982, dated Nov. 1, 2013, 34 pages.
"Final Office Action", U.S. Appl. No. 13/310,032, dated Oct. 31, 2013, 21 pages.
"Final Office Action", U.S. Appl. No. 13/675,711, dated Jun. 23, 2015, 14 pages.
"Final Office Action", U.S. Appl. No. 13/675,807, dated May 22, 2015, 24 pages.
"Final Office Action", U.S. Appl. No. 13/681,643, dated Mar. 15, 2016, 25 pages.
"Final Office Action", U.S. Appl. No. 13/681,643, dated Apr. 12, 2017, 40 pages.
"Final Office Action", U.S. Appl. No. 13/681,643, dated May 4, 2018, 24 pages.
"Final Office Action", U.S. Appl. No. 13/681,643, dated May 5, 2015, 14 pages.
"Final Office Action", U.S. Appl. No. 13/688,421, dated Jul. 29, 2015, 22 pages.
"Final Office Action", U.S. Appl. No. 13/690,724, dated Mar. 21, 2019, 10 pages.
"Final Office Action", U.S. Appl. No. 13/690,724, dated May 17, 2017, 15 pages.
"Final Office Action", U.S. Appl. No. 13/690,724, dated Dec. 10, 2015, 11 pages.
"Final Office Action", U.S. Appl. No. 13/690,755, dated Sep. 10, 2014, 7 pages.
"Final Office Action", U.S. Appl. No. 13/720,316, dated Nov. 17, 2017, 17 pages.
"First Action Interview Office Action", U.S. Appl. No. 13/720,316, dated Oct. 22, 2015, 4 pages.
"MPEG Surround Specification", International Organization for Standardization, Coding of Moving Pictures and Audio; ISO/IEF JTC 1/SC 29/WG 11; Bangkok, Thailand, Jan. 19, 2006, 186 pages.
"Non-Final Office Action", U.S. Appl. No. 12/852,349, dated Jan. 30, 2014, 35 pages.
"Non-Final Office Action", U.S. Appl. No. 12/852,349, dated Apr. 10, 2013, 26 pages.
"Non-Final Office Action", U.S. Appl. No. 12/852,349, dated Jul. 5, 2012, 17 pages.
"Non-Final Office Action", U.S. Appl. No. 13/309,982, dated Jan. 17, 2013, 32 pages.
"Non-Final Office Action", U.S. Appl. No. 13/309,982, dated Mar. 24, 2014, 35 pages.
"Non-Final Office Action", U.S. Appl. No. 13/310,032, dated Jan. 3, 2013, 18 pages.

(56) References Cited

OTHER PUBLICATIONS

"Non-Final Office Action", U.S. Appl. No. 13/310,032, dated Mar. 7, 2014, 21 pages.
"Non-Final Office Action", U.S. Appl. No. 13/660,159, dated Oct. 1, 2014, 7 pages.
"Non-Final Office Action", U.S. Appl. No. 13/675,711, dated Mar. 11, 2015, 14 pages.
"Non-Final Office Action", U.S. Appl. No. 13/675,807, dated Dec. 17, 2014, 18 pages.
"Non-Final Office Action", U.S. Appl. No. 13/680,952, dated Aug. 4, 2014, 8 pages.
"Non-Final Office Action", U.S. Appl. No. 13/681,643, dated Jan. 7, 2015, 10 pages.
"Non-Final Office Action", U.S. Appl. No. 13/681,643, dated Oct. 16, 2015, 27 pages.
"Non-Final Office Action", U.S. Appl. No. 13/681,643, dated Oct. 20, 2017, 34 pages.
"Non-Final Office Action", U.S. Appl. No. 13/681,643, dated Nov. 17, 2016, 23 pages.
"Non-Final Office Action", U.S. Appl. No. 13/688,421, dated Jan. 7, 2016, 20 pages.
"Non-Final Office Action", U.S. Appl. No. 13/688,421, dated Feb. 4, 2015, 18 pages.
"Non-Final Office Action", U.S. Appl. No. 13/690,724, dated Apr. 5, 2016, 11 pages.
"Non-Final Office Action", U.S. Appl. No. 13/690,724, dated Jun. 18, 2015, 7 pages.
"Non-Final Office Action", U.S. Appl. No. 13/690,724, dated Aug. 9, 2018, 8 pages.
"Non-Final Office Action", U.S. Appl. No. 13/690,724, dated Oct. 24, 2016, 13 pages.
"Non-Final Office Action", U.S. Appl. No. 13/690,724, dated Dec. 1, 2017, 15 pages.
"Non-Final Office Action", U.S. Appl. No. 13/690,755, dated Mar. 2, 2015, 8 pages.
"Non-Final Office Action", U.S. Appl. No. 13/690,755, dated Mar. 28, 2014, 7 pages.
"Non-Final Office Action", U.S. Appl. No. 13/720,258, dated Mar. 3, 2015, 14 pages.
"Non-Final Office Action", U.S. Appl. No. 13/720,316, dated Apr. 8, 2016, 14 pages.
"Non-Final Office Action", U.S. Appl. No. 13/720,316, dated Apr. 19, 2018, 10 pages.
"Non-Final Office Action", U.S. Appl. No. 13/720,316, dated May 9, 2017, 16 pages.
"Non-Final Office Action", U.S. Appl. No. 13/720,316, dated Oct. 4, 2016, 15 pages.
"Non-Final Office Action", U.S. Appl. No. 13/722,825, dated Mar. 25, 2015, 17 pages.
"Notice of Allowance", U.S. Appl. No. 13/309,982, dated Jul. 30, 2014, 6 pages.
"Notice of Allowance", U.S. Appl. No. 13/310,032, dated Aug. 26, 2014, 6 pages.
"Notice of Allowance", U.S. Appl. No. 13/660,159, dated Mar. 10, 2015, 6 pages.
"Notice of Allowance", U.S. Appl. No. 13/675,711, dated Jan. 20, 2016, 11 pages.
"Notice of Allowance", U.S. Appl. No. 13/675,807, dated Aug. 27, 2015, 6 pages.
"Notice of Allowance", U.S. Appl. No. 13/680,952, dated Mar. 17, 2015, 6 pages.
"Notice of Allowance", U.S. Appl. No. 13/681,643, dated Nov. 13, 2018, 12 pages.
"Notice of Allowance", U.S. Appl. No. 13/688,421, dated Jun. 6, 2016, 10 pages.
"Notice of Allowance", U.S. Appl. No. 13/690,724, dated Jun. 12, 2019, 11 pages.
"Notice of Allowance", U.S. Appl. No. 13/690,755, dated Jun. 5, 2015, 6 pages.
"Notice of Allowance", U.S. Appl. No. 13/720,258, dated Jul. 24, 2015, 8 pages.
"Notice of Allowance", U.S. Appl. No. 13/720,258, dated Sep. 18, 2015, 2 pages.
"Notice of Allowance", U.S. Appl. No. 13/720,316, dated Aug. 16, 2018, 8 pages.
"Notice of Allowance", U.S. Appl. No. 13/722,825, dated Aug. 28, 2015, 10 pages.
"Pre-Interview Communication", U.S. Appl. No. 13/720,316, dated Aug. 5, 2015, 3 pages.
"Restriction Requirement", U.S. Appl. No. 13/660,159, dated Jun. 12, 2014, 6 pages.
"Restriction Requirement", U.S. Appl. No. 13/690,724, dated Feb. 26, 2015, 6 Pages.
"Restriction Requirement", U.S. Appl. No. 13/722,825, dated Oct. 9, 2014, 7 pages.
"Supplemental Notice of Allowance", U.S. Appl. No. 13/310,032, dated Nov. 3, 2014, 4 pages.
"Supplemental Notice of Allowance", U.S. Appl. No. 13/680,952, dated Jun. 11, 2015, 3 pages.
"Supplemental Notice of Allowance", U.S. Appl. No. 13/681,643, dated Mar. 1, 2019, 10 pages.
"Supplemental Notice of Allowance", U.S. Appl. No. 13/681,643, dated Dec. 6, 2018, 10 pages.
"Supplemental Notice of Allowance", U.S. Appl. No. 13/690,755, dated Aug. 18, 2015, 4 pages.
"Time Domain Pitch Scaling using Synchronous Overlap and Add", retrieved from <http://homepages.inspire.net.nz/~jamckinnon/report/sola.htm> on Nov. 12, 2012, 3 pages.
"Waveform Similarity Based Overlap-Add (WSOLA)", retrieved from <http://www.pjsip.org/pjmedia/docs/html/group_PJMED_WSOLA.htm> on Nov. 12, 2012, 4 pages.
Breckon,"Non-parametric 3D Surface Completion", International Conference on 3D Digital Imaging and Modeling '05 (Jun. 13, 2005), 8 pages., Jun. 13, 2005, 8 pages.
Curless,"A Volumetric Method for Building Complex Models from Range Images", In SIGGRAPH, ACM Press, Aug. 4, 1996, 10 pages.
Davis,"Filling Holes in Complex Surfaces using Volumtric Diffusion", International Symposium on 3D Data Processing Visualization and Transmission. Jun. 19, 2002, 11 pages., Jun. 19, 2002, 11 pages.
De"Traditional (?) Implementations of a Phase-Vocoder: The Tricks of the Trade", Proceedings of the COST G-6 Conference on Digital Audio Effects (DAFX-00), Verona, Italy, Dec. 7-9, 2000, retrieved from <http://128.112.136.35/courses/archive/spring09/cos325/Bernardini.pdf> on Nov. 12, 2012, Dec. 7, 2000, 7 pages.
Debevec,"Modeling and Rendering Architecture from Photographs: A Hybrid Geometry-and Image-Based Approach", SIGGRAPH Conference Proceedings, Jan. 1996, pp. 1-10.
Dolson,"The Phase Vocoder: A Tutorial", retrieved from <http://www.panix.com/~jens/pvoc-dolson.par> on Nov. 12, 2012, 11 pages.
Dueck,"Non-metric Affinity Propagation for Unsupervised Image Categorization", IEEE 11th International Conference on Computer Vision, 2007, Oct. 14, 2007, 8 pages.
Felzenszwalb,"Efficient Belief Propagation for Early Vision", International Journal of Computer Vision, 70(1), 2006, pp. 41-54.
Gastal,"Shared Sampling for Real-Time Alpha Matting", Eurographics 2010, vol. 29, No. 2, 2010, 10 pages.
Goesele,"Multi-View Stereo Revisited", Computer Vision and Pattern Recognition, 2006, 8 pages.
Gutierrez-Osuna,"L19: Prosodic Modificatin of Speech", Lecture based on [Taylor, 2009, ch. 14; Holmes, 2001, ch. 5; Moulines and Charpentier, 1990], retrieved from <http://research.cs.tamu.edu/prism/lectures/sp/l19.pdf> on Nov. 12, 2012, 35 pages.
He,"A Global Sampling Method for Alpha Matting", CVPR 2011, 2011, pp. 2049-2056.
He,"Corner detector based on global and local curvature properties", Retrieved from <http://hub.hku.hk/bitstream/10722/57246/1/142282.pdf> on Dec. 21, 2012, May 2008, 13 pages.
Hirsch,"Fast Removal of Non-uniform Camera Shake", Retrieved from <http://webdav.is.mpg.de/pixel/fast_removal_of_camera_shake/

(56) References Cited

OTHER PUBLICATIONS files/Hirsch_ICCV2011_Fast%20removal%20of%20non-uniform%20camera%20shake.pdf> on Dec. 21, 2012, 8 pages.
Ioffe,"Improved Consistent Sampling, Weighted Minhash and L1 Sketching", ICDM '10 Proceedings of the 2010 IEEE International Conference on Data Mining, Dec. 2010, 10 pages.
Jehan,"Creating Music by Listening", In PhD Thesis of Massachusetts Institute of Technology, Retrieved from <http://web.media.mit.edu/~tristan/Papers/PhD_Tristan.pdf>, Sep. 2005, 137 pages.
Jia,"Single Image Motion Deblurring Using Transparency", Retrieved from <http://www.cse.cuhk.edu.hk/~leojia/all_final_papers/motion_deblur_cvpr07.pdf> on Dec. 21, 2012, 8 pages.
Klingbeil,"SPEAR: Sinusoidal Partial Editing Analysis and Resynthesis", retrieved from <http://www.klingbeil.com/spear/> on Nov. 12, 2012, 3 pages.
Kubo,"Characterization of the Tikhonov Regularization for Numerical Analysis of Inverse Boundary Value Problems by Using the Singular Value Decomposition", Inverse Problems in Engineering Mechanics, 1998, 1998, pp. 337-344.
Levin,"A Closed Form Solution to Natural Image Matting", CVPR, 2006, 2006, 8 pages.
Levin,"Image and Depth from a Conventional Camera with a Coded Aperture", ACM Transactions on Graphics, SIGGRAPH 2007 Conference Proceedings, San Diego, CA, Retrieved from <http://groups.csail.mit.edu/graphics/CodedAperture/CodedAperture-LevinEtAl-SIGGRAPH07.pdf> on Dec. 21, 2012, 2007, 9 pages.
McAulay,"Speech Processing Based on a Sinusoidal Model", The Lincoln Laboratory Journal, vol. 1, No. 2, 1998, retrieved from <http://www.ll.mit.edu/publications/journal/pdf/vol01_no2/1.2.3.speechprocessing.pdf> on Nov. 12, 2012, 1988, pp. 153-168.
Moinet,"PVSOLA: A Phase Vocoder with Synchronized Overlap-Add", Proc. of the 14th Int. Conference on Digital Audio Effects (DAFx-11), Paris, France, Sep. 19-23, 2011, retrieved from <http://tcts.fpms.ac.be/publications/papers/2011/dafx2011_pvsola_amtd.pdf> on Nov. 12, 2012, Sep. 19, 2011, 7 pages.
Okutomi,"A Multiple-Baseline Stereo", IEEE Transactions on Pattern Analysis and Machine Intelligence, vol. 15, No. 4, Apr. 1993, 11 pages.
Park,"Extracting Salient Keywords from Instructional Videos Using Joint Text, Audio and Visual Cues", Proceedings of the Human Language Technology Conference of the North American Chapter of the ACL, Association for Computational Linguistics, 2006, Jun. 2006, pp. 109-112.
Patton,"ELEC 484 Project—Pitch Synchronous Overlap-Add", retrieved from <http://www.joshpatton.org/yeshua/Elec484/Elec484_files/ELEC%20484%20-%20PSOLA%20Final%20Project%20Report.pdf> on Nov. 12, 2012, 11 pages.
Radhakrishnan,"A Content-Adaptive Analysis and Representation Framework for Audio Event Discovery from "Unscripted" Multimedia", Hindawi Publishing Corporation, EURASIP Journal on Applied Signal Processing, vol. 2006, Article ID 89013, 2006, 24 pages.
Rodet,"Musical Sound Signal Analysis/Synthesis: Sinusoidal+Residual and Elementary Waveform Models", TFTS'97 (IEEE Time-Frequency and Time-Scale Workshop 97), Coventry, Grande Bretagne, août, 1997, retrieved from <http://articles.ircam.fr/textes/Rodet97e/index.html> on Nov. 12, 2012, 1997, 16 pages.
Roelands,"Waveform Similarity Based Overlap-Add (WSOLA) for Time-Scale Modification of Speech: Structures and Evaluation", retrieved from <http://citeseerx.ist.psu.edu/viewdoc/summary?doi=10.1.1.58.1356> on Nov. 12, 2012, 4 pages.

Serra,"A System for Sound Analysis/Transformation/Synthesis Based on a Deterministic Plus Stochastic Decomposition", retrieved from <https://ccrma.stanford.edu/files/papers/stanm58.pdf> on Nov. 12, 2012, Oct. 1989, 166 pages.
Serra,"Approaches to Sinusoidal Plus Residual Modeling", retrieved from <http://www.dtic.upf.edu/~xserra/cursos/CCRMA-workshop/lectures/7-SMS-related-research.pdf> on Nov. 12, 2012, 21 pages.
Serra,"Musical Sound Modeling with Sinusoids Plus Noise", published in C. Roads, S. Pope, A. Picialli, G. De Poli, editors. 1997. "Musical Signal Processing". Swets & Zeitlinger Publishers, retrieved from <http://web.media.mit.edu/~tristan/Classes/MAS.945/Papers/Technical/Serra_SMS_97.pdf> on Nov. 12, 2012, 1997, 25 pages.
Sharf,"Context-based Surface Completion", ACM Trans. Graph. Aug. 2004, 10 pages, Aug. 2004, 10 pages.
Sinha,"Interactive 3D Architectural Modeling from Unordered Photo Collections", ACM Transactions on Graphics, vol. 27, No. 5, Article 159, Dec. 2008, pp. 159:1-159:10.
Smaragdis,"A Probabilistic Latent Variable Model for Acoustic Modeling", NIPS, 2006, 6 pages.
Smaragdis,"Supervised and Semi-Supervised Separation of Sounds from Single-Channel Mixtures", ICA'07 Proceedings of the 7th international conference on Independent component analysis and signal separation, 2007, 8 pages.
Smith"MUS421/EE367B Applications Lecture 9C: Time Scale Modification (TSM) and Frequency Scaling/Shifting", retrieved from <https://ccrma.stanford.edu/~jos/TSM/TSM.pdf> on Nov. 12, 2012, Mar. 8, 2012, 15 pages.
Smith,"Blue Screen Matting", SIGGRAPH 96 Conference Proceedings, Aug. 1996, 10 pages.
Smith,"Stereo Matching with Nonparametric Smoothness Priors in Feature Space", CVPR 2009 (Jun. 22, 2009), 8 pages., Jun. 22, 2009, 8 pages.
Su,"Over-Segmentation Based Background Modeling and Foreground Detection with Shadow Removal by Using Hierarchical MRFs", Proceedings of the 10th Asian conference on Computer vision—vol. Part III, Nov. 2010, 12 pages.
Upperman,"Changing Pitch with PSOLA for Voice Conversion", retrieved from <http://cnx.org/content/m12474/latest/?collection=col10379/1.1> on Nov. 12, 2012, 1 page.
Verhelst,"An Overlap-Add Technique Based on Waveform Similarity (WSOLA) for High Quality Time-Scale Modification of Speech", retrieved from <http://citeseerx.ist.psu.edu/viewdoc/download?doi=10.1.1.202.5460&rep=rep1&type=pdf> on Nov. 12, 2012, 4 pages.
Verhelst,"Overlap-Add Methods for Time-Scaling of Speech", retrieved from <http://citeseerx.ist.psu.edu/viewdoc/summary?doi=10.1.1.128.7991> on Nov. 12, 2012, 25 pages.
Xiao,"Joint Affinity Propagation for Multiple View Segmentation", IEEE 11th International Conference on Computer Vision, 2007, Oct. 14, 2007, 7 pages.
Yang,"A Constant-Space Belief Propagation Algorithm for Stereo Matching", CVPR, 2010, 8 pages.
Yang,"Stereo Matching with Color-Weighted Correlation, Hierarchical Belief Propagation, and Occlusion Handling", IEEE Transactions on Pattern Analysis and Machine Intelligence, vol. 31 Issue 3, Mar. 2009, 13 pages.
Yuan,"Image Deblurring with Blurred/Noisy Image Pairs", Proceedings of ACM SIGGRAPH, vol. 26, Issue 3, Jul. 2007, 10 pages.
Zhu,"Fusion of Time-of-Flight Depth and Stereo for High Accuracy Depth Maps", IEEE Conference on Computer Vision and Pattern Recognition, Jun. 23, 2008, 8 pages.

* cited by examiner

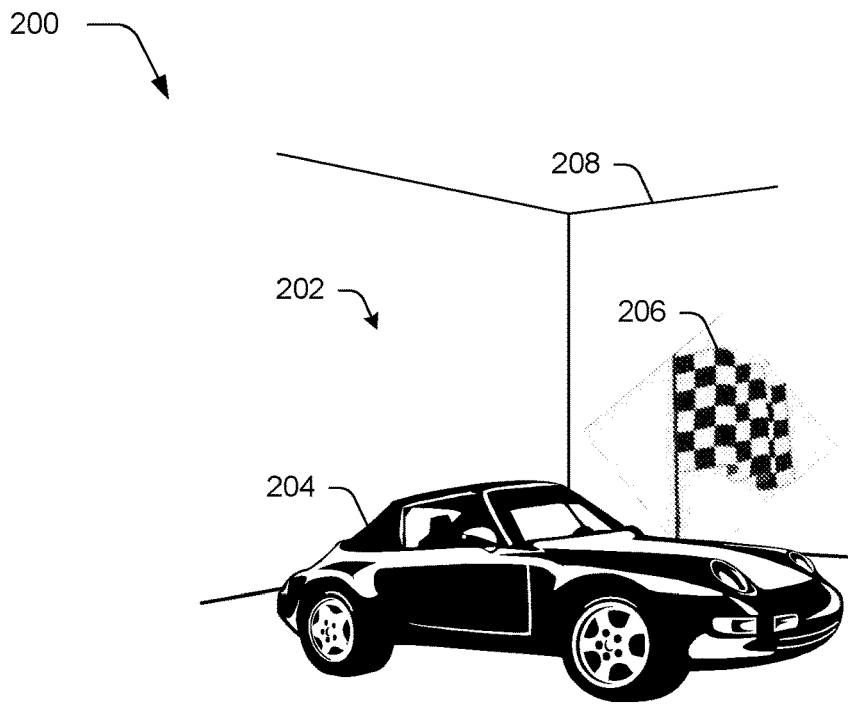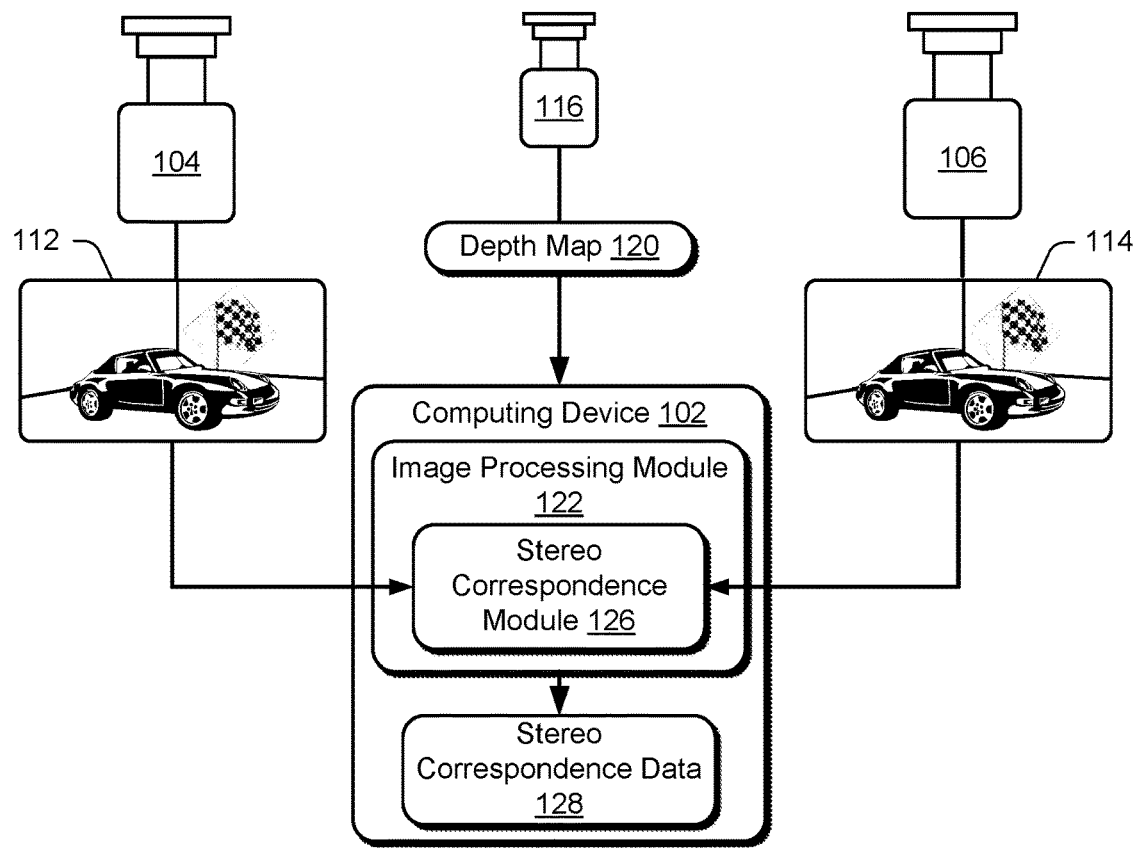
Fig. 2

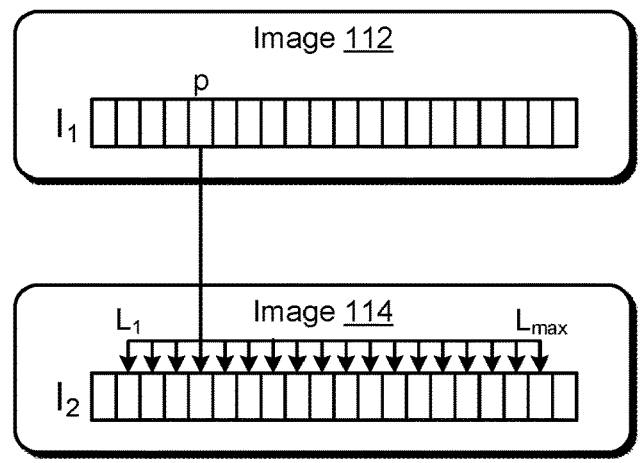
Fig. 8
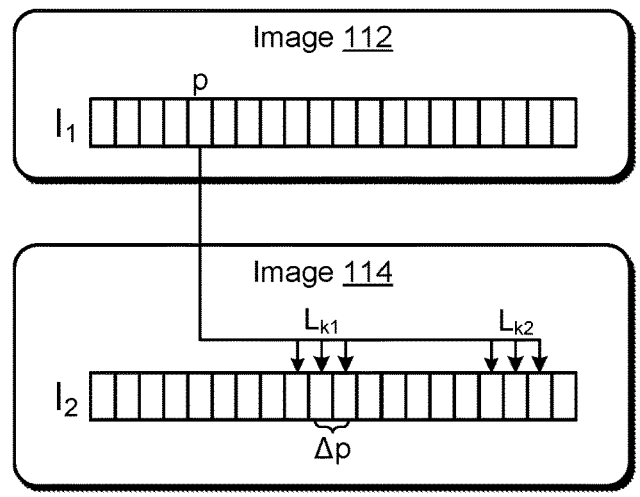
Fig. 9

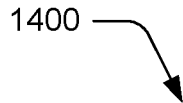

1400 ─┐

```
┌─────────────────────────────────────────────────────────────┐
│                          1402                               │
│  Receive a depth map from one or more depth sensors of an   │
│  image scene, the depth map describing depth disparities    │
│  of the image scene                                         │
└─────────────────────────────────────────────────────────────┘
```

```
┌─────────────────────────────────────────────────────────────┐
│                          1404                               │
│  Calculate stereo correspondence of image data of           │
│  stereoscopic images of the image scene, which is performed │
│  based at least in part on the determined search range and  │
│  the depth map                                              │
│  ┌───────────────────────────────────────────────────────┐  │
│  │                    1406                               │  │
│  │  Calculate a data cost based on a set of known        │  │
│  │  disparities around a fixed neighborhood of a pixel,  │  │
│  │  the set of known disparities indicated by the depth  │  │
│  │  map                                                  │  │
│  └───────────────────────────────────────────────────────┘  │
│  ┌───────────────────────────────────────────────────────┐  │
│  │                    1408                               │  │
│  │  Calculate a smoothness cost based at least in part   │  │
│  │  on guided filtering performed using a respective one │  │
│  │  of the stereoscopic images and the depth map         │  │
│  └───────────────────────────────────────────────────────┘  │
└─────────────────────────────────────────────────────────────┘
```

*Fig. 14*

STEREO CORRESPONDENCE AND DEPTH SENSORS

CLAIM OF PRIORITY

This application is a division of and claims priority to U.S. patent application Ser. No. 13/690,724, filed Nov. 30, 2012, entitled "Stereo Correspondence and Depth Sensors", the entire disclosure of which is hereby incorporated by reference herein in its entirety.

GOVERNMENT LICENSE RIGHTS

This invention was made with government support under Prime Award #:1019343 Subaward #: CIF-C-149, CFDA: 47.070 awarded by The National Science Foundation. The government has certain rights in the invention. This material is based upon work supported by the National Science Foundation under Grant #1019343 to the Computing Research Association for the CIFellows Project.

BACKGROUND

Stereo correspondence calculations may be used to determine which parts in stereo images correspond to each other. For example, stereo images may be captured of a scene using an image capture device. The stereo images may then be processed to determine which points in the images correspond to each other. This may be utilized to support a variety of functionality, such as to determine depth of the scene from the images to perform three dimensional modeling of the scene, perform view synthesis, view interpolation, content manipulation, matting (e.g., object removal), support augmented reality (e.g., object insertion), and so on.

However, conventional techniques that were employed to perform this processing could encounter ambiguities that are not able to be resolved using the conventional techniques. This may include ambiguities caused by regions of the images that do not include textures or features (e.g., a white wall), repeated patterns (e.g., a checkerboard), shadows, view-point changes, and so on. Consequently, processing at these points in the image could fail using conventional techniques.

SUMMARY

Stereo correspondence and depth sensor techniques are described. In one or more implementations, a depth map generated through use of a depth sensor is leveraged as part of processing of stereo images to assist in identifying which parts of stereo images correspond to each other. The depth map, for instance, may be utilized to assist in identifying depth discontinuities in the stereo images. Additionally, techniques may be employed to align the depth discontinuities identified from the depth map to image edges identified from the stereo images. Techniques may also be employed to suppress image edges that do not correspond to the depth discontinuities of the depth map in comparison with image edges that do correspond to the depth discontinuities as part of the identification.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 2 depicts a system in an example implementation in which images are captured of an image scene and used with a depth map to calculate image correspondence data.

FIG. 8 depicts an example of a search range employed for a conventional stereo correspondence determination.

FIG. 9 depicts an example of a search range for a stereo correspondence determination that is defined at least in part on an output of a depth sensor.

FIG. 14 is a flow diagram depicting a procedure in an example implementation in which in which a depth map of a depth sensor is used to perform a stereo correspondence calculation.

DETAILED DESCRIPTION

Overview

As previously described, conventional techniques may be ill suited to determine stereo correspondence when confronted with a variety of ambiguities. These ambiguities include lack of textures or features (e.g., a white wall), repeated patterns (e.g., a checkerboard), shadows, viewpoint changes, and so on. Accordingly, stereo correspondence at such locations in stereo images may be difficult to determine using conventional techniques.

Stereo correspondence and depth sensor techniques are described in which a depth map generated through use of a depth sensor may be used to assist a determination of stereo correspondence of stereo images. The depth map, for instance, may be used to identify image edges that correspond to depth discontinuities. The depth map may be configured in a variety of ways, such as a direct output from a depth sensor 116, involve additional processing, e.g., to change resolution, up-sampling, occlusion reduction, and so on. In this way, stereo correspondence processing may be performed that suppresses image edges that do not correspond to the depth discontinuities, thereby discounting "false positives" that were conventionally caused by significant differences in textures and features. This suppression may be performed in a variety of ways, such as to remove such edges from a calculation, employ a weighting based on correspondence to a depth discontinuity, and so on.

Techniques are also described that involve alignment of depth discontinuities to corresponding image edges. Generation of the depth map, for instance, may have a degree of error, the depth map may have a lower resolution than the images, and so on. Accordingly, these techniques may be utilized to align the depth discontinuities to corresponding image edges to reduce and even eliminate these errors. This may include displacement of the depth discontinuities to coordinates that generally correspond to the image edges. Further, techniques are described in which the depth sensor may be utilized to define a search range to be used for a stereo correspondence calculation, as well as for use in cost calculations performed as part of the stereo correspondence calculation. Further discussion of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
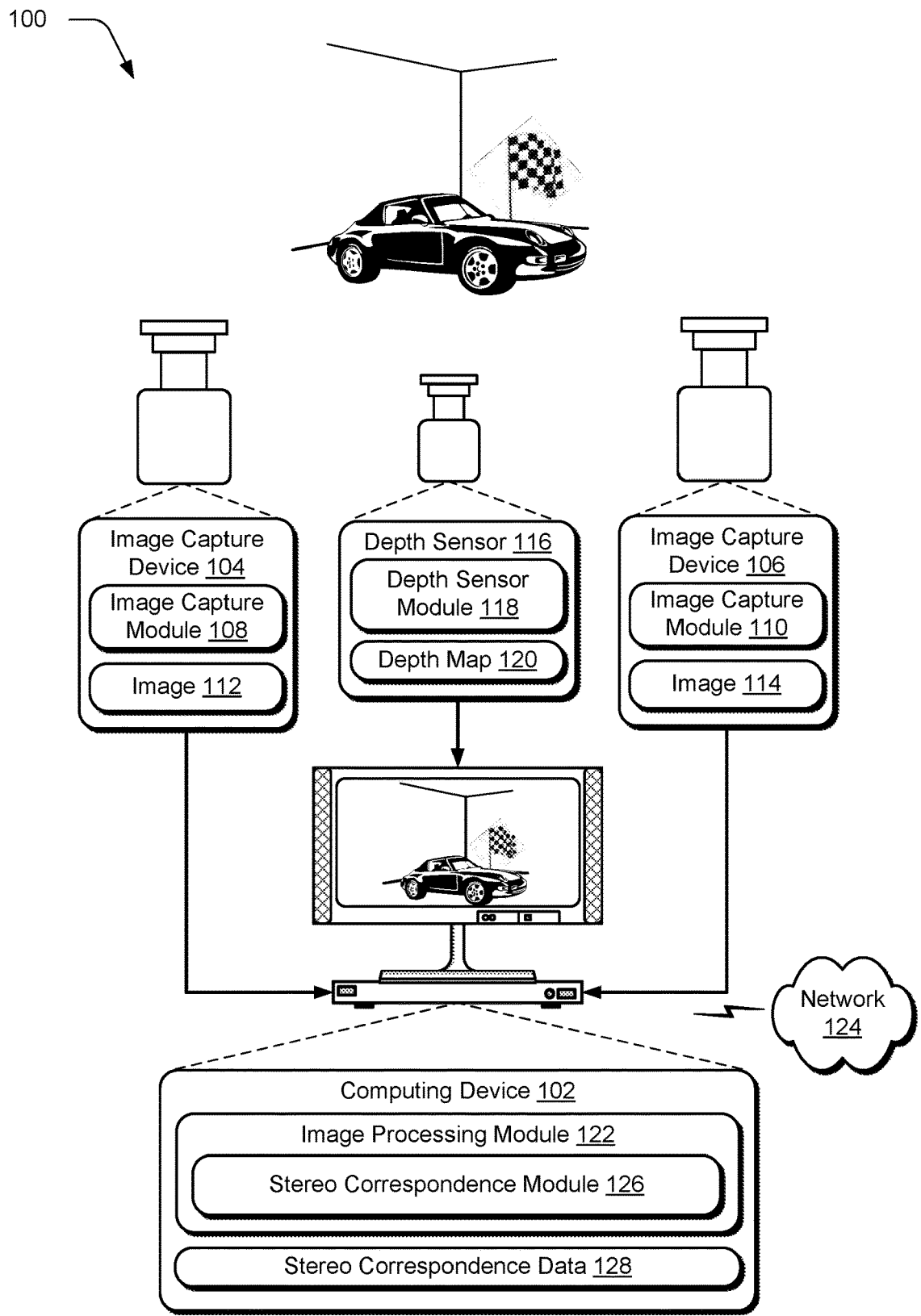
FIG. 1 is an illustration of an environment in an example implementation that is operable to employ techniques described herein involving a depth sensor.

FIG. 1 is an illustration of an environment 100 in an example implementation that is operable to employ techniques described herein. The illustrated environment 100 includes a computing device 102 and a plurality of image capture devices 104, 106, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 15.

The image capture devices 104, 106 may also be configured in a variety of ways. Illustrated examples of such configurations include a standalone camera such as a dedicated device, part of a mobile phone or tablet, and so on. Other examples are also contemplated. For example, each of the image capture devices 104, 106 may be configured as a single stereoscopic camera, scanner, copier, camera, mobile device (e.g., smart phone), and so forth. In another example, a single image capture device 104 may be used to capture multiple images of an image scene, such as the car, flag, and room as illustrated.

The image capture devices 104, 106 are illustrated as including a respective image capture module 108, 110. The image capture modules 108, 110 are representative of functionality to capture respective images 112, 114, such as by including image sensors and other hardware and software components to capture, process, and/or store images 112, 114.

The images 112, 114 in this example are stereoscopic in that the images are taken from different viewpoints of the illustrated image scene. For example, the images 112, 114 may be viewable by a user to gain a perception of three dimensional depth of the image scene. As previously described, the images 112, 114 may also be usable to model the image scene in three dimensions. This may be performed in a variety of ways as further described below.

The environment 100 is also illustrated as including a depth sensor 116 and depth sensor module 118. The depth sensor 116 and image capture devices 104, 106 may be configured in a variety of ways. In one such example, the depth sensor 116 and image capture devices 104, 106 are configured as a single system, such as through use of a stereoscopic camera and integrated depth sensor, through configuration as a single device, incorporated within a unified housing, and so on. In another example, stand-alone devices may be employed. Other examples and configurations are also contemplated, such as through arrangement of the depth sensor 116 between the image capture devices 104, 106.

The depth sensor 116 and depth sensor module 118 are representative of functionality to generate a depth map 120 that describes depths at different portions of the image scene. The depth sensor module 118, for instance, may be configured to implement a range camera in which a projector (e.g., an infrared projector) and camera are utilized to detect depths of objects at different portions of the environment. Other examples are also contemplated, such as a time of flight camera, laser range finder, acoustic device, a projector camera device, a structured light device, and so on.

The depths detected by the depth sensor 116 may then be used by the depth sensor module 118 to generate a depth map 120. The depth map 120, therefore, may describe depths of the image scene at different coordinates, which may be leveraged to assist is performing a stereo correspondence calculation.

The computing device 102 is illustrated as including an image processing module 122. The image processing module 122 is representative of functionality to perform one or more techniques that are usable to process an image. Although illustrated as implemented locally on the computing device, functionality of the image processing module may also be implemented in a distributed environment, remotely via a network 124 (e.g., "over the cloud") as further described in relation to FIG. 15, and so on.

An example of image processing that may be performed by the image processing module 122 is represented as a stereo correspondence module 126. The stereo correspondence module 126 is representative of functionality to generate stereo correspondence data 128 that describes which points (i.e., coordinates) in stereoscopic images correspond to each other. The stereo correspondence module 126, for instance, may process images 112, 114 to determine depth of the image scene to perform three dimensional modeling, perform view synthesis, view interpolation, content manipulation, matting (e.g., object removal), support augmented reality (e.g., object insertion), and so on. This processing may be performed in a variety of ways, further description of which may be found in the following discussion and corresponding figure.

FIG. 2 depicts a system 200 in an example implementation in which images 112, 114 are captured of an image scene 202 and used with a depth map to calculate image correspondence data 128. The image scene 202 is illustrated as including a car 204 and a checkered flag 206 in a white-walled room 208. The image capture devices 104, 106 are illustrated as capturing stereoscopic images 112, 114 of the image scene 202. As previously described, the stereoscopic images may be leveraged for a variety of purposes, such as for three dimensional modeling, view interpolation, and so on.

To support this functionality, the image processing module 122 may employ a stereo correspondence module 126 to compute stereo correspondence data 128 that describes which points in the images 112, 114 correspond to each other. Conventional techniques that were utilized to perform this technique typically relied upon analysis of textures and features in the images 112, 114. However, the images may include portions that cause ambiguities in these conventional techniques. The white walled room 208, for instance, may lack texture and features and therefore cause ambiguities. In another instance, the checkered flag 206 may cause identification of image edges due to differences in textures that are not indicative of a depth discontinuity.

Accordingly, the stereo correspondence module 126 may leverage a depth map 120 that is generated based on an output of one or more depth sensors 116. The depth map 120 may describe depth at different locations (e.g., coordinates) in the image scene 202 and therefore used to assist in the generation of stereo correspondence data 128. This may include identification of which image edges correspond to depth discontinuities described in the depth map 120. Therefore, image edges that do not correspond to the depth discontinuities may be suppressed in portions of the calculation of the stereo correspondence data 128, e.g., used generally in a calculation in stereo correspondence and suppressed in calculation of a smoothness value as further described below. These techniques may be implemented in a variety of ways, discussion of an example of which may be found in relation to the following discussion and corresponding figure.

Figure 3:
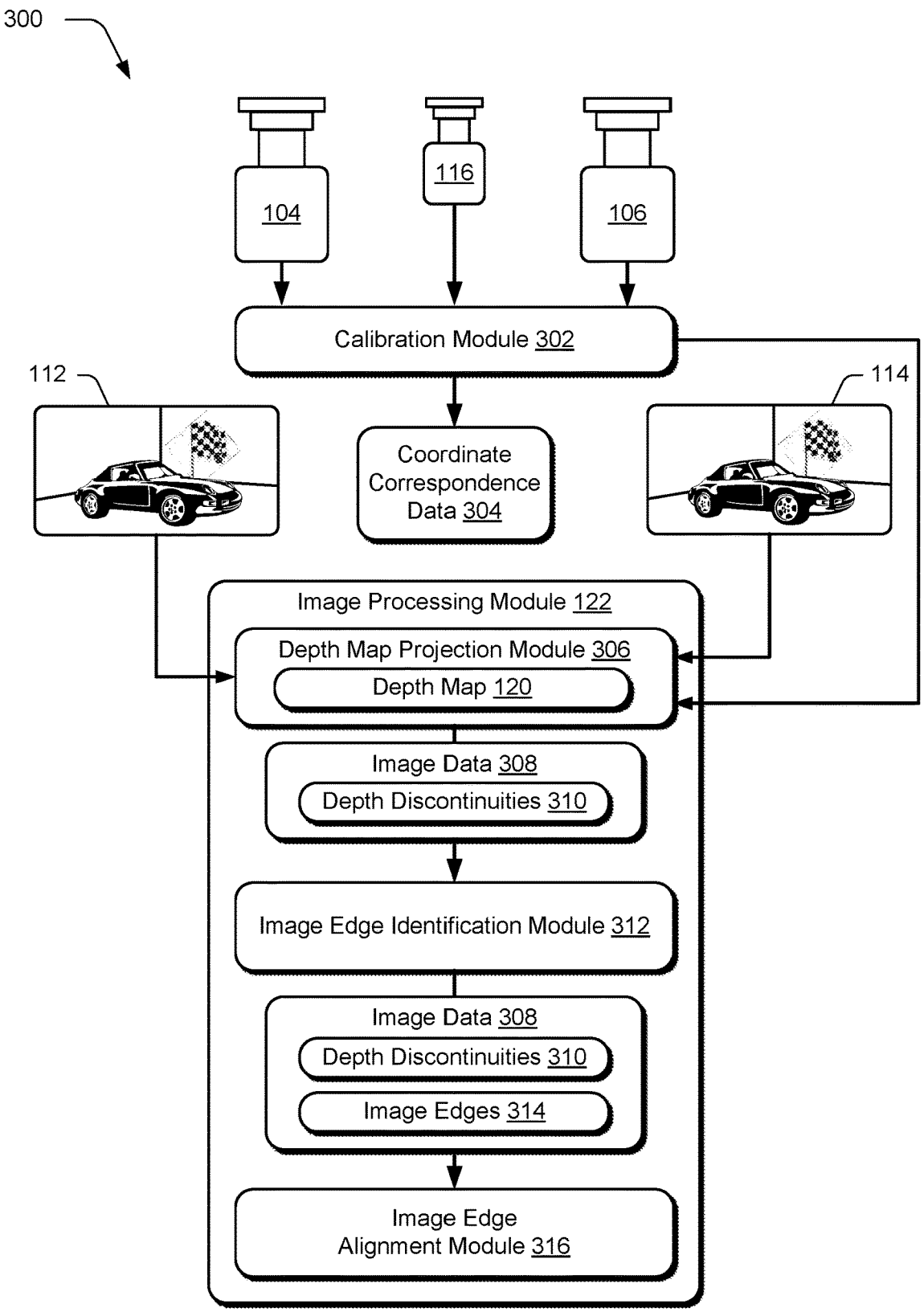
FIG. 3 depicts a system in an example implementation in which implementation of parts of functionality of a stereo correspondence module of FIG. 1 is shown using a plurality of modules.

FIG. 3 depicts a system 300 in an example implementation in which implementation of parts of functionality of the stereo correspondence module 126 is shown using a plurality of modules. The system 300 is illustrated as including a calibration module 302. The calibration module 302 is representative of functionality to calibrate an output of the image capture devices 104, 106 and the depth sensor 116 to each other.

The calibration module 302, for instance, may be configured to calculate coordinate correspondence data 304 that is usable to align coordinates of outputs of the respective devices to each other. This may include projection of coordinates for different resolutions supported by the devices. For example, the depth sensor 116 may operate at a resolution that is lower than the resolution of the image capture devices 104, 106. Accordingly, a transformation may be calculated such that the coordinates of the devices correspond. In one or more implementations, this calibration may be performed in two dimensions. A variety of other examples are also contemplated, such to perform rectification and other techniques such that the output may be aligned to each other. Although illustrated separately, it should be readily apparent that the calibration module 302 may also be coordinated as part of the image processing module 122 or elsewhere, e.g., as part of the devices themselves to provide a resolved output.

The image processing module 122 is illustrated as including a depth map projection module 306. The depth map projection module 306 is representative of functionality to project the depth map 120 onto coordinates of the images 112, 114 based on the coordinate correspondence data 304. The depth map 120, for instance, may be generated based on an output of the depth sensor 116 to describe depths at different coordinates of the image scene 202. These coordinates may then be projected onto coordinates of the images 112, 114 using the coordinate correspondence data 304 such that the image data 308 for the images 112, 114 now includes indications of depth discontinuities 310 based on changes in depths indicated by the depth map 120.

The images 112, 114 may also be processed by an image edge identification module 312. This processing may be performed before or after the projection of the depth map 120. The image edge identification module 312 is representative of functionality to identify image edges 314 in image data 308 of the images 112, 114 based on characteristics of the images. The image edge identification module 312, for instance, may examine the images 112, 114 separately to detect image edges that are likely indicative of a depth discontinuity. This may include examining textures and features of the images 112, 114 to determine where differences in the textures or features may be detected that are indicative of an image edge.

Figure 4:
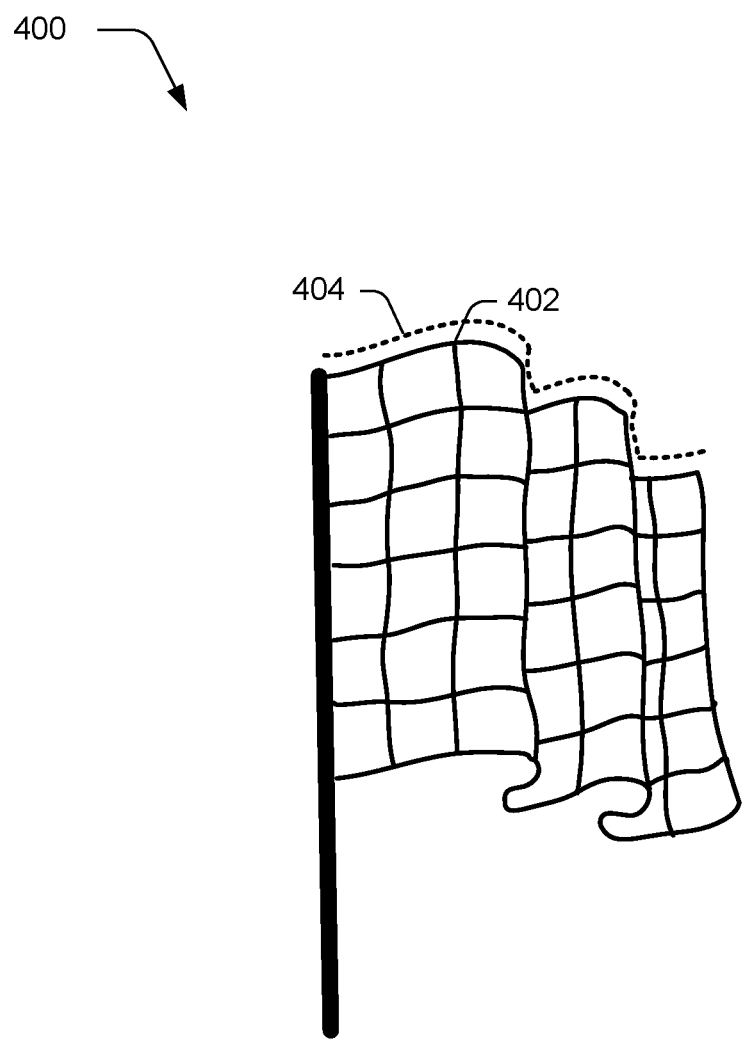
FIG. 4 is an illustration of an example implementation showing image edges detected for a checkered flag in the image of FIG. 1.

As shown in the example implementation 400 of FIG. 4, for instance, image edges 314 detected for the checkered flag in the image 112 are shown through the use of lines. As illustrated, the image edges include edges that coincide with a change in depth between the flag and its surroundings, e.g., the white walled room 208, as well as changes in depth in ripples in the flag, itself. These techniques may also cause image edges to be detected between checkers in the flag itself, e.g., between the black and white squares. As such, these image edges do not coincide with depth discontinuities. Accordingly, the depth discontinuities 310 identified using the depth map 120 may be used to differentiate between these different types of image edges, further discussion of which may be found in relation to the discussion of FIG. 5.

Returning again to FIG. 3, the image processing module 122 may also include an image edge alignment module 316. The image edge alignment module 316 is representative of functionality to align depth discontinuities 310 to corresponding image edges 314 in the image data 308. The depth sensor 116, for instance, may have a degree of error in the generation of the depth map 120, such as due to limitations in resolution, hardware, distances, and so forth. Accordingly, the image edge alignment module 316 may be used to align the depth discontinuities 310 to generally coincide with the image edges 314.

Returning again to FIG. 4, as previously described in image edge 402 may be detected based on texture, features, and so on by the image edge identification module 312 through examination of characteristics of pixels of the image. A depth discontinuity 404 indicated by the depth map 120, however, may be offset from the image edge 402.

Accordingly, the image edge alignment module 316 may examine the image edges and depth discontinuities. The image edge alignment module 316 may then displace depth discontinuities indicated by projection of the depth map 120 to generally correspond to the corresponding image edges, such as to display coordinates of the depth discontinuity 404 to align with the image edge 402 of the flag. The determination of correspondence of depth discontinuities and image edges may be performed in a variety of ways, such as based on a nearest image edge, based on matching of overall shapes of the depth discontinuities to image edges, based on a margin of error of the depth sensor 116, and so forth. The image edges and depth discontinuities may then be processed for a determination of stereo correspondence, an example of which is described as follows and shown in a corresponding figure.

Figure 5:
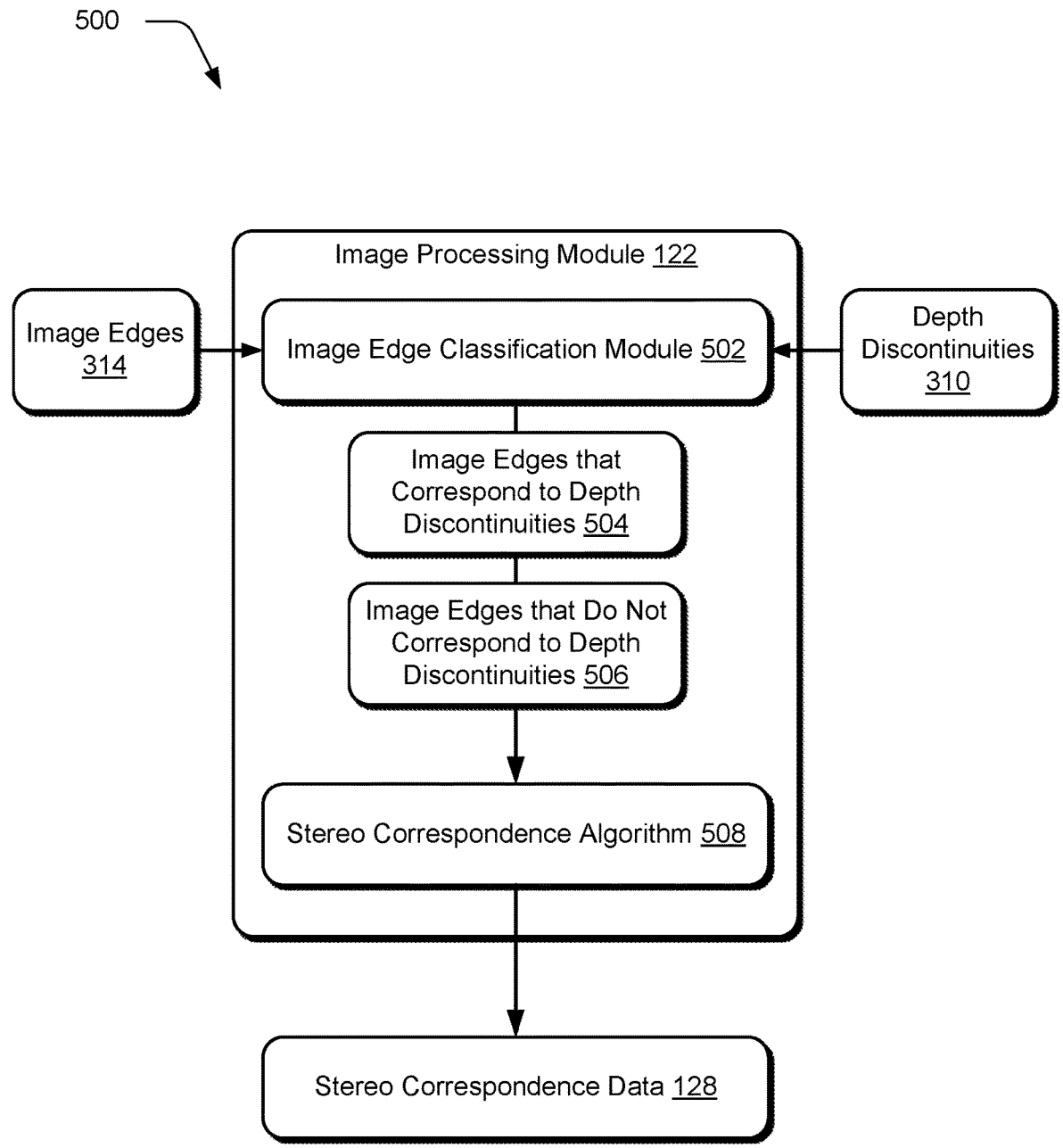
FIG. 5 depicts a system in an example implementation in which images edges and depth discontinuities are utilized as part of calculation of stereo correspondence from a plurality of images.

FIG. 5 depicts a system 500 in an example implementation in which images edges and depth discontinuities are utilized as part of calculation of stereo correspondence from a plurality of images. In this example, the image processing module 122 is illustrated as including an image edge classification module 502. The image edge classification module 502 is illustrated as receiving data describing image edges 314 and depth discontinuities 310, e.g., from the depth map 120. This data may result from an output of the image edge identification module 312 and depth map projection module 306, may include an output of the image edge alignment module 316 (e.g., including depth discontinuities that are aligned to image edges), and so on.

The image edge classification module 502 is representative of functionality to classify image edges 314 as image edges that correspond to depth discontinuities 504. The image edge classification module 502, for instance, may determine based on a comparison of coordinates that an image edge identified based on characteristics of pixels in an image corresponds to a depth discontinuity indicated by an output of the depth sensor 116. Likewise, this comparison may also be used to classify image edges 314 as image edges that do not correspond to depth discontinuities 506 using similar techniques. This classification may be performed in a variety of ways, such as a binary classification, use of a weighting value based on correspondence of the image edges and depth discontinuities, and so on.

Figure 6:
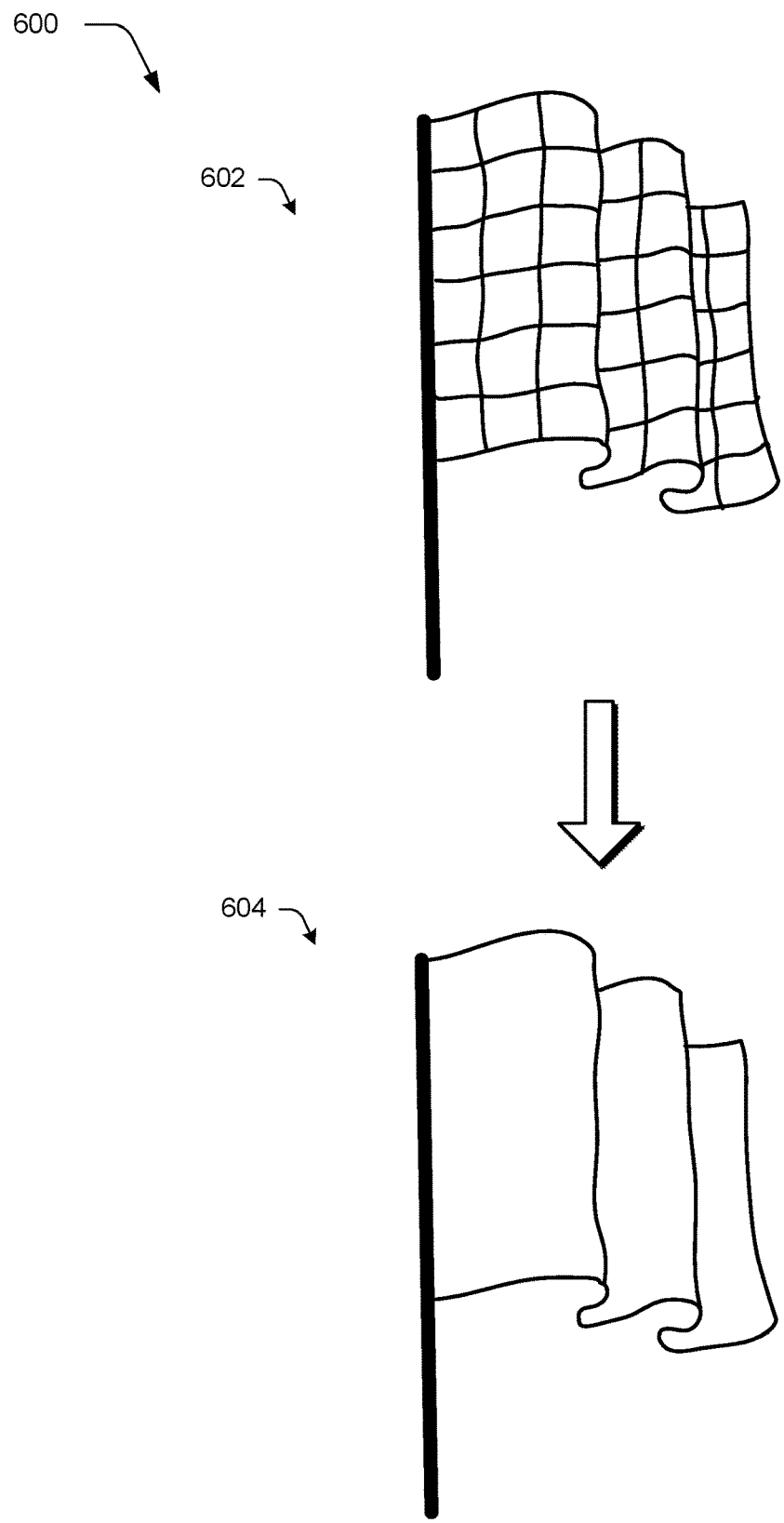
FIG. 6 is an illustration of stages of processing of image edges and depth discontinuities for the checkered flag by the image edge identification module of FIG. 3.

As shown in the example implementation 600 of FIG. 6, for instance, a first stage 602 is shown of image edges 314 that were identified for the checkered flag by the image edge identification module 312. After processing by the image edge classification module 502, image edges that correspond to depth discontinuities 504 are shown in the second stage 604 and image edges that do not correspond to depth discontinuities 506 are suppressed. Thus, a distinction may be made between image edges that do not correspond to depth discontinuities 506 and image edges that do correspond to depth discontinuities 504 for a determination of stereo correspondence. As previously described, this distinction may be expressed in a variety of ways, including use of a weighting value.

Returning again to FIG. 5, this information may be processed by a stereo correspondence algorithm 508 to generate stereo correspondence data 128. The stereo correspondence algorithm 508, for instance, may suppress image edges that do not correspond to depth discontinuities 506 in the calculation of the stereo correspondence data 128, whereas image edges that correspond to depth discontinuities 504 are not suppressed, e.g., for calculation of smoothness values. This may include adjustment of weighting, cost (e.g., for use as part of an energy function), and so on as further described below. In this way, the calculation of stereo correspondence may be performed such that image edges that correspond to depth discontinuities 504 are given greater effect than that of the image edges that do not correspond to the depth discontinuities 506. Thus, the depth map 120 may be utilized to improve accuracy in the calculation of which points correspond in images.

Figure 7:
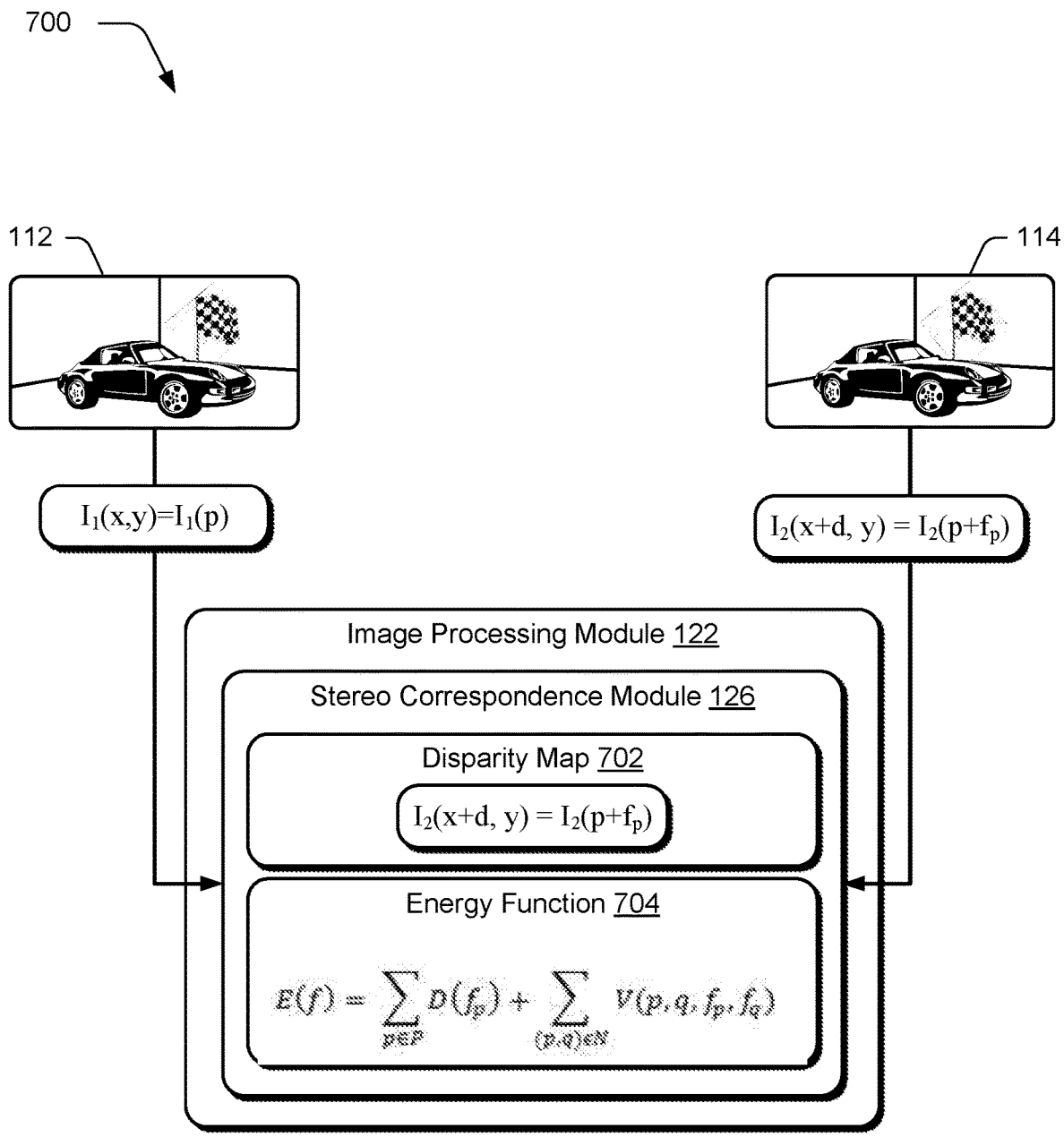
FIG. 7 depicts an example of the stereo correspondence module of FIG. 1 as employing a disparity map and energy function.

Stereo correspondence may be calculated in a variety of ways, an example 700 of which is shown in FIG. 7. For instance, stereo correspondence may be formulated as a labeling problem in which "P" is a set of pixels in an image. "L" is a set of labels that represent the disparities, and therefore "L" may be defined such that "L={$L_1$, $L_2$, ..., $L_{max}$}." A value "f" is a labeling that is usable to assign a label "$f_p \epsilon L$" to each pixel "pϵP."

Imaging planes of the images 112, 114 may be aligned in parallel, such that corresponding pixels in image 112 (e.g., "$I_1$" in the below discussion) correspond to pixels in image 114 (e.g., "$I_2$") in a same row "y". However, the displacement "d" is not known, which is also referenced as the disparity in the following discussion. Other instances are also contemplated, such as to employ rectification for images that are not aligned in parallel.

As shown in the example implementation 700 of FIG. 7, for instance, image 112 may be considered a reference image and thus colors of pixels of image 112 may be expressed as "$I_1(x,y)=I_1(p)$." Following this convention, pixels in image 114 may be located at a disparity "d" from the pixels in image 112. Pixels in image 114 (e.g., "$I_2$") may therefore be expressed as "$I_2(x+d, y)=I_2(p+f_p)$." Thus, disparity may change at each pixel. It should be noted that disparity is generally inversely proportion to depth, such that closer objects tend to move between the two images more whereas objects located at "infinity" do not move between the two images, respectively.

The disparity may be expressed as a disparity map 702, which may be used to express "d" and label "$f_p$", such as "$d=D(x \cdot y)=f_p$." Accordingly, the stereo correspondence algorithm 508 may employ an energy function 704 to perform the stereo correspondence calculation, an example of which follows:

$$E(f) = \sum_{p \in P} D(p, f_p) + \sum_{(p,q) \in N} V(p, q, f_p, f_q)$$

In the above expression, the following portion is used to calculate a data cost:

$$\sum_{p \in P} D(p, f_p)$$

The above energy function also includes a smoothness cost, which is represented as follows:

$$\sum_{(p,q) \in N} V(p, q, f_p, f_q)$$

The data cost may be used to assign a cost based on a comparison of a pixel to another pixel between images to determine which disparity is "best" and thus indicates a likely correspondence between the pixels. The stereo correspondence module 126, for instance, may examine pixels in a row in image 114 to compare colors to a pixel chosen from image 112. Costs may be assigned based on this disparity and thus the data cost measures consistency of images, as shown in the following expression:

$$D(p,f_p)=|I_1(p)-I_2(p+f_p)|$$

As shown above, if the colors are quite different (e.g., a white pixel from image 112 being compared to a black pixel in image 114) a cost of assigning the value of this pixel may be quite high in comparison with a pixel that is closer in color. Although costs are described, other techniques may also be employed, such as through use of thresholds, sum of squared differences, and so on.

The smoothness cost of the energy function may be used to assign a cost based on similarity of a pixel to other pixels in the neighborhood of the pixel in the image 112. Thus, the smoothness cost is based on consistency within the image 112, itself, as shown in the following expression:

$$V(p,q,f_p,f_q)=|f_p-f_q|*\exp(-|I_1(p)-I_1(q)|/\sigma)$$

This is generally performed for a neighborhood "N" for a pixel in question as further described below.

The smoothness cost is based on an assumption that values of neighboring pixels are close. However, this is not the case at depth discontinuities. Therefore, conventional techniques assigned costs such that the cost is minimized for pixels that are likely indicative of a large disparity. These techniques, for instance, may employ a threshold above which costs are minimized.

Additionally, a weighting factor may be employed to weight a corresponding effect of the data cost and the smoothness cost in relation to each other. The smoothness cost, for instance, may include a value "λ" that specifies weighting to be applied for the smoothness cost, which may be spatially varying. This weighting may be adjusted at each pixel based on a variety of factors, such as based on confidence such that at less confidence a higher weighting is given to a smoothness cost, and so on.

As previously described in relation to FIG. 6 there are often more image edges than depth discontinuities, such that checkers in a checkered flag would conventionally indicate image edges and therefore depth discontinuities based on examination of pixels in the image, solely. However, techniques are described herein in which an output of the depth sensor 116 may be used to define a search range for both the data cost and the smoothness cost, which may improve efficiency and accuracy of the search for stereo correspondence, further discussion of which may be found in relation to the following description and corresponding figure.

FIG. 8 depicts an example 800 of a search range employed for a conventional stereo correspondence determination. As previously described, a set of potential labels "L" is a set of labels for a pixel "p" in image 112 that represent potential disparities, and therefore "L" may be defined such that "$L=\{L_1, L_2, \ldots, L_{max}\}$" as shown in the figure.

Thus, a search range that includes each of the potential labels in image 114 is performed for each pixel "p" in a conventional data cost calculation for the energy function above. However, techniques are also described herein in which the search range may be reduced by leveraging information from the depth sensor 116, an example of which is described as follows and shown in the corresponding figure.

FIG. 9 depicts an example 900 of a search range for a stereo correspondence determination that is defined at least in part on an output of a depth sensor 116. In this example, the depth sensor 116 provides an output of suggested disparities 902, which include "$L_{k1}$" and "$L_{k2}$." Using this information, for each pixel "p" a set of potential labels in image 114 (e.g., "$I_2$") may be expressed as follows:

$$L_p=U_i\{[L_{ki}-\Delta p, L_{ki}+\Delta_p]\}$$

in which "Δp" is a pixel specific search range to be used in the stereo correspondence calculation. Additionally, weightings may be utilized to increase relative importance of labels suggested by the depth sensor, distance from these values, and so on. Thus, the search range may be lessened by leveraging this information, which may improve processing speed, efficiency, and accuracy in the calculation.

The search range "Δp" may be determined by a variety of factors, including a confidence of the depth sensor 116 in the neighborhood, uniqueness of window at "p" within a fixed search range, and so on. For example, reference will now be made again to FIG. 2. The depth sensor 116 may generate a depth map 120 as previously described that maps depths of the image scene 202. However, the depth map 120 may include portions in which the depth was not able to be determined, might include errors, and so on. The depth map 120, for instance, may not include depths of faraway objects, such as the walls of the room, occluded objects, and so forth.

Accordingly, the stereo correspondence module 126 may employ techniques to quantify confidence in values of the depths in the depth map 120. One such example is to base confidence from density of the values in the depth map 120 around a pixel such that a search range is inversely related to the density. The stereo correspondence module 126, for instance, may employ a sliding window operation to measure density of known depth sensor 116 values in a defined area, e.g., a ten by ten area. This area may be defined based on a variety of factors, such as resolution difference between the depth sensor 116 and image capture devices 104, 106, distance range in the image scene 202, based on farthest distance in the image scene 202, size of images 112, 114, and so on.

For example, a density at "(x,y)" may be calculated based on a number of known depth values in a neighborhood of "(x,y)" divided by an area of the neighborhood. A search map may then be defined as "round(max_search*exp(-density/sigma))" that defines search ranges for the pixels based on the density and therefore the confidence of those values. The search map may be used to calculate the search range "Δp" to be used in the stereo correspondence calculation as further described below. Thus, by quantifying the confidence in the values in the depth map 120 the stereo correspondence module 126 may give greater weight to depths having a higher degree of confidence than that given to depths that have a lower degree of confidence.

The search range "Δp" to be used for the stereo correspondence calculation may also be determined based on uniqueness of window at "p" within a fixed search range of the image. For example, a uniqueness operator may be utilized to define a patch (i.e., a defined area) around each pixel "p," such as three by three, five by five, and so on. This patch may then be compared with other patches within a neighborhood (e.g., a rectangular area or other shape) around the patch, such as a six by thirty neighborhood.

The uniqueness may then be determined as a best match score between the patch and another patch (i.e., another defined area) in the neighborhood that does not include a score of a self-match. The search range that is based on uniqueness may then be set based on a maximum change encountered, which may then be used to compute the stereo search range "Δp" as further described below.

For example, to calculate a search range based on uniqueness for a patch "P1" centered at "(x,y)", a match may be performed to other patches in a defined neighborhood using a sum of squared differences. A uniqueness score "uscore" may then be calculated as a minimum of the sum of the squared differences.

The search range "Δp" may then be calculated from the search range based on uniqueness and/or the search range indicated by the search map that is based on confidence. For example, the search range "Δp" may be computed as a minimum of the search range based on uniqueness and/or the search range that is based on confidence. In one or more implementations, a maximum search range is set in instances in which unknowns are encountered, e.g., when the search range suggested by the uniqueness score or confidence score is zero. Accordingly, low textured and repeating pattern regions in an image are assigned a lower search range "Δp" compared to the textured/unique regions. Thus, search range "Δp" may be used to calculate stereo correspondence between the images 112, 114 as part of the data cost. The depth map 120 output by the depth sensor may also be used in comparison of pixels within an image as part of a smoothness cost, as further described below.

As previously described, a smoothness cost may be defined for the energy function as follows:

$$\sum_{(p,q) \in N} V(p, q, f_p, f_q)$$

The smoothness cost is used to assign a cost based on similarity of a pixel to other pixels in the neighborhood of the pixel in the image, e.g., the same image. Thus, the smoothness cost is based on consistency within the image, itself, as shown in the following expression:

$$V(p,q,f_p,f_q) = |f_p - f_q| * \exp(-|I_1(p) - I_1(q)|/\sigma)$$

A pairwise label cost is represented as "$|f_p - f_q|$" in the above expression. This calculation is generally performed for a neighborhood "N" for a pixel in question.

In traditional stereo correspondence calculation, neighboring pixels of a similar color were assigned the same labels such that a high affinity was assigned a low cost. However, techniques are described herein in which "$|G_1(p) - G_1(q)|$" is used in which "$G_1$" is obtained from guided filtering of disparities described by the depth map 120 (which may include up-sampling in instances in which the depth map 120, has a lower resolution than the images 112, 114.

As previously described in relation to FIGS. 5 and 6, for instance, this technique may be used to mask down images edges that do not correspond to depth discontinuities 506 and retain image edges that do correspond to depth discontinuities 504. In this way, guided filtering may be used to filter and therefore suppress image edges that were identified at a first stage 602 to arrive at the image edges shown in the second stage 604.

Figure 10:
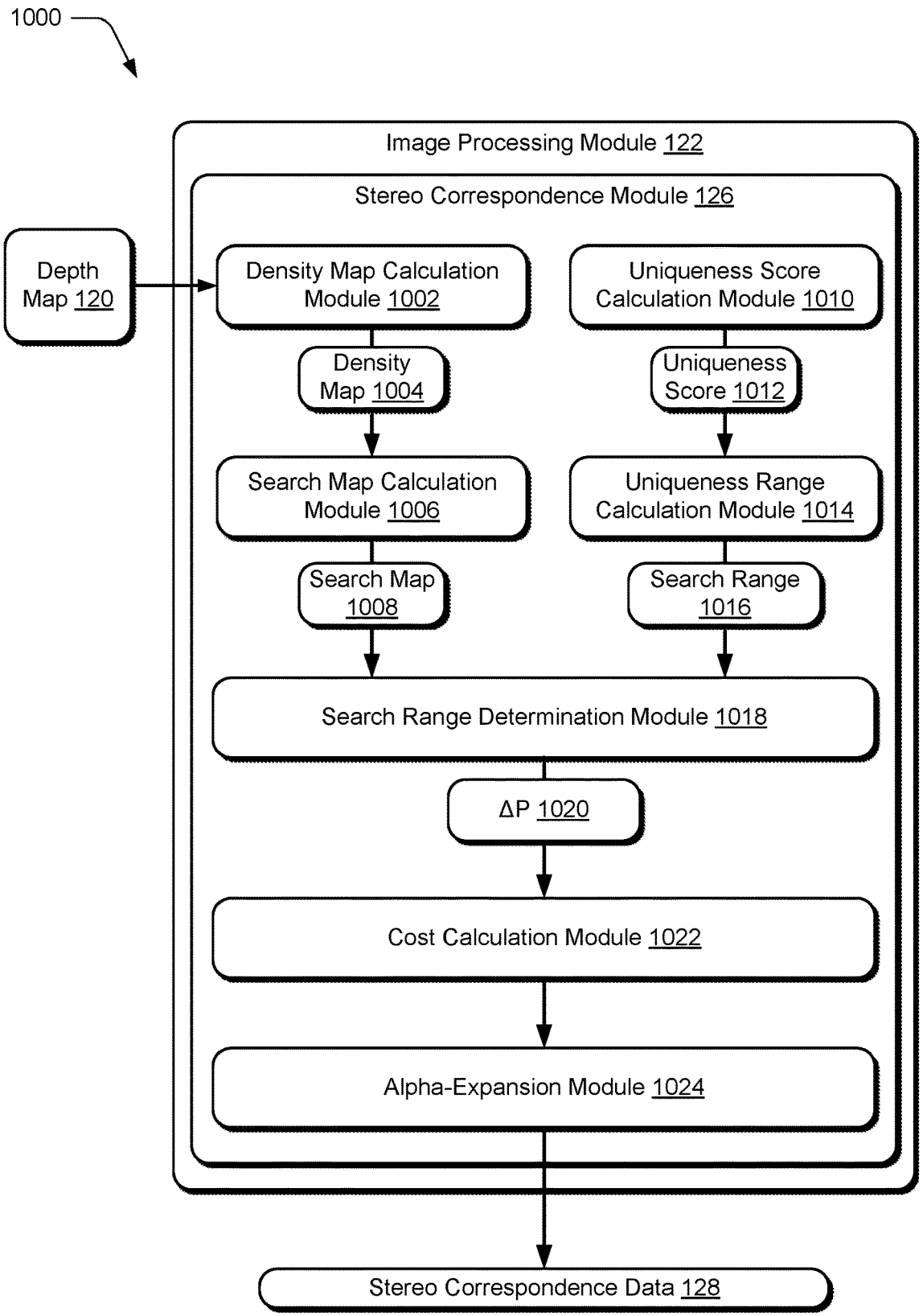
FIG. 10 depicts a system showing an example implementation of the stereo correspondence module of FIG. 1.

FIG. 10 depicts a system 1000 showing an example implementation of the stereo correspondence module 126 of FIG. 1. The stereo correspondence module 126 may perform the following operations represented as a series of modules to determine stereo correspondence based at least in part on a depth map 120 output by the depth sensor 116. A density map calculation module 1002 is configured to generate a density map 1004 from the depth map 120. A search map calculation module 1006 may then be employed to convert the density map 1004 into a search map 1008 that describes a search range to be used based on the density, and therefore confidence at that pixel/coordinate although other examples are also contemplated. For example, a density at "(x,y)" may be calculated based on a number of known depth values in a neighborhood of "(x,y)" divided by an area of the neighborhood. The search map 1008 may then be defined as "round(max_search*exp(-density/sigma))."

A uniqueness score calculation module 1010 may also be employed to calculate a uniqueness score 1012 for each patch in an image. A uniqueness range calculation module 1014 may then be employed to convert the uniqueness score 1012 to a search range 1016 that is based on uniqueness of a corresponding pixel. For example, to calculate a search range based on uniqueness for a patch "P1" centered at "(x,y)", a match may be performed to other patches in a defined neighborhood using a sum of squared differences. A uniqueness score "uscore" may then be calculated as a minimum of the sum of the squared differences. The search range based on uniqueness may then be defined at least in part using the following expression "round((1-exp(-uscore/sigma))*max_search)+1."

A search range determination module 1018 may then be utilized to calculate a search range "Δp" 1020 based at least in part on search ranges in the search map 1008 based on confidence and the search range 1016 based on uniqueness or other criteria. For example, if density at "(x,y)" is zero, then a maximum disparity range is used by the search range determination module 1018. However, if the density is not zero, "Δp" 1020 may be set by the search range determination module 1018 as the minimum of the search range indicated by search map 1008 or the search range 1016 indicated based on uniqueness. The determined search range "Δp" 1020 may then be used as part of the determination of stereo correspondence, such as to define "where to look" as previously described.

A data cost at each pixel "p=(x,y)" is then initialized by a cost calculation module 1022, with "$D(f_p)$" set to infinity, for all $f_p \in L$. The data cost is calculated by the cost calculation module 1022 at each pixel "p," at "(x,y)," for all "$f_p \in L_p = U_i \{[L_{ki} - \Delta(x,y), L_{ki} + \Delta(x,y)]\}$." As previously described, "$L_{ki}$" is the set of all (unique) known disparities around a fixed neighborhood of "p" found by the depth sensor 116, as shown in the following expression:

$$D(p, f_p) = |I_1(p) - I_2(p + f_p)|$$

A smoothness cost is also calculated by the cost calculation module 1022 using the following expression to assign a cost based on similarity of pixels to other pixels in an neighborhood in the same image:

$$V(p, q, f_p, f_q) = |f_p - f_q| * \exp(-|G_1(p) - G_1(q)|/\sigma)$$

where $G_1$ is obtained from guided filtering. The corresponding RGB stereo image ($I_1$) is the guidance image and the depth map 120 from the depth sensor 116 (which may be up-sampled as previously described) is the filtering input image. Alpha-expansion may then be performed by an alpha-expansion module 1024 using adaptive cycles until convergence to generate the stereo correspondence data 128 that describes correspondence of pixels between the images 112, 114. Other examples are also contemplated, such as belief propagation.

Example Procedures

The following discussion describes stereo correspondence and depth sensor techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

Figure 11:
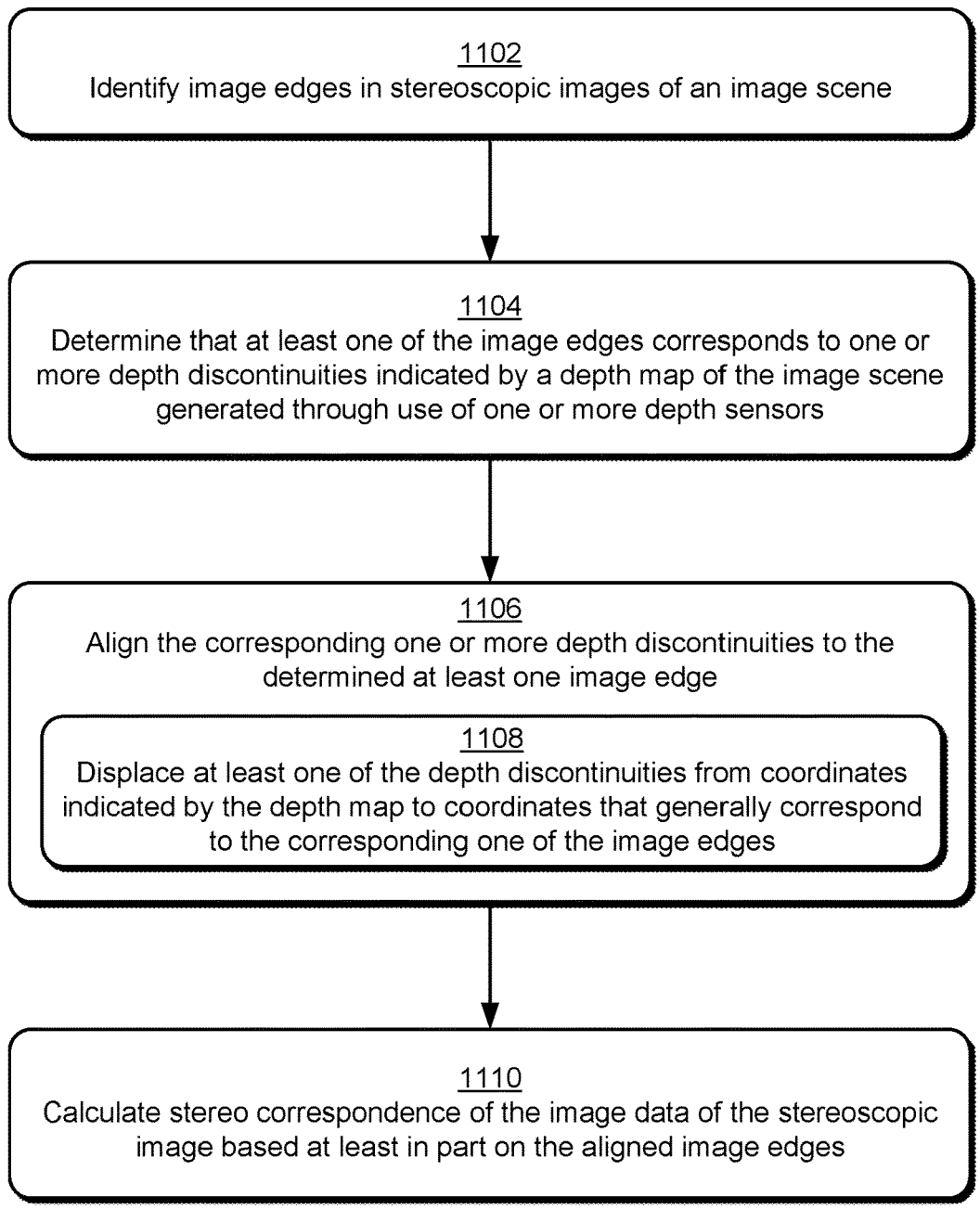
FIG. 11 is a flow diagram depicting a procedure in an example implementation in which depth discontinuities are aligned to image edges.

FIG. 11 depicts a procedure 1100 in an example implementation in which depth discontinuities are aligned to image edges. Image edges are identified in stereoscopic images of an image scene (block 1102). The stereoscopic images, for instance, may be captured by one or more image capture devices, such as a stereoscopic camera, a plurality of different cameras, and so on. The image edges may then be located individually in the images, such as through analysis of textures, features, and other characteristics of the images.

A determination is made that at least one of the image edges corresponds to one or more depth discontinuities indicated by a depth map of the image scene, the depth map generated through use of one or more depth sensors (block 1104). The depth map, for instance, may indicate that a depth discontinuity is located near but not coexistent with an image edge. This may be performed in a variety of ways as previously described, such as through shape comparison, use of a defined neighborhood, based on a margin of error of the depth sensor, and so on.

The corresponding one or more depth discontinuities are aligned to the determined at least one edge (block 1106). This may be performed in a variety of ways. For example, at least one of the depth discontinuities may be displaced from coordinates indicated by the depth map to coordinates that generally corresponding to the corresponding one of the image edges (block 1108).

Stereo correspondence of the image data is then calculated based at least in part on the aligned image edges (block 1110). This may be performed in a variety of ways, such as through comparison of the images and the depth discontinuities indicated by the depth map. Further discussion of an example of calculation of stereo correspondence may be found in relation to the following figure.

Figure 12:
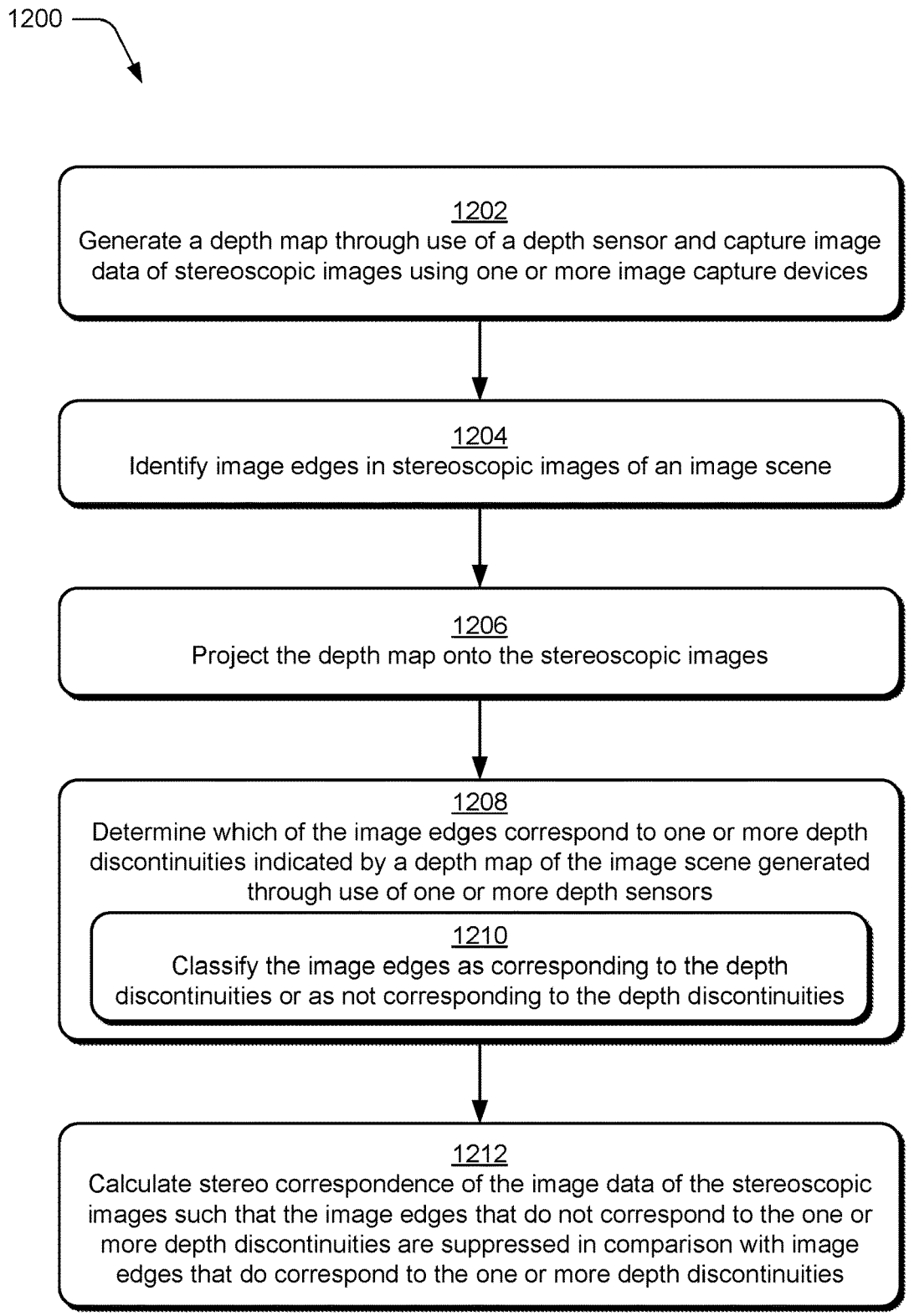
FIG. 12 is a flow diagram depicting a procedure in an example implementation in which stereoscopic correspondence is calculated of image data based at least in part on a depth map.

FIG. 12 depicts a procedure 1200 in an example implementation in which stereoscopic correspondence is calculated of image data based at least in part on a depth map. A depth map is generated through use of a depth sensor and image data of stereoscopic images is captured using one or more image capture devices (block 1202). As before, the image capture devices 104, 106 and the depth sensor 116 may be employed to capture this data. The depth map, for instance, may be output directly by the depth sensor itself, may involve additional processing such as occlusion resolution, involve a change in resolution, and so forth.

Image edges are identified in the stereoscopic images of an image scene (block 1204). An image edge identification module 312, for instance, may be employed to identify the image edges based on characteristics of the images, themselves, such as textures, colors, and so on.

A depth map is projected onto the stereoscopic images (block 1206). The depth map projection module 306 may be employed to project the depth map 120 onto the images to form image data 308 that includes indications of depth discontinuities 310 and image edges 314. As previously described, the order for the projection and location may also be reversed.

A determination is made to determine correspondence of the image edges to one or more depth discontinuities indicated by a depth map of the image scene generated through use of one or more depth sensors (block 1208). For example, the images edges may be classified as corresponding to the depth discontinuities or as not corresponding to the depth discontinuities (block 1210). This may include use of weights that indicate an amount of correspondence between the image edges and the depth discontinuities. As shown in FIG. 6, for instance images edges are shown at the first stage 602, with image edges that generally correspond to depth discontinuities shown at the second stage 604.

Stereo correspondence is calculated of the image data of the stereoscopic images such that the image edges that do not correspond to the one or more depth discontinuities are suppressed in comparison with image edges that do correspond to the one or more depth discontinuities (block 1212). This may include configuration of weighting, cost, and so on such that the image edges that do correspond to the one or more depth discontinuities have a greater effect on the calculation of stereo correspondence than image edges that do not correspond to the one or more depth discontinuities. An example of this is described beginning in the following discussion and corresponding figure.

Figure 13:
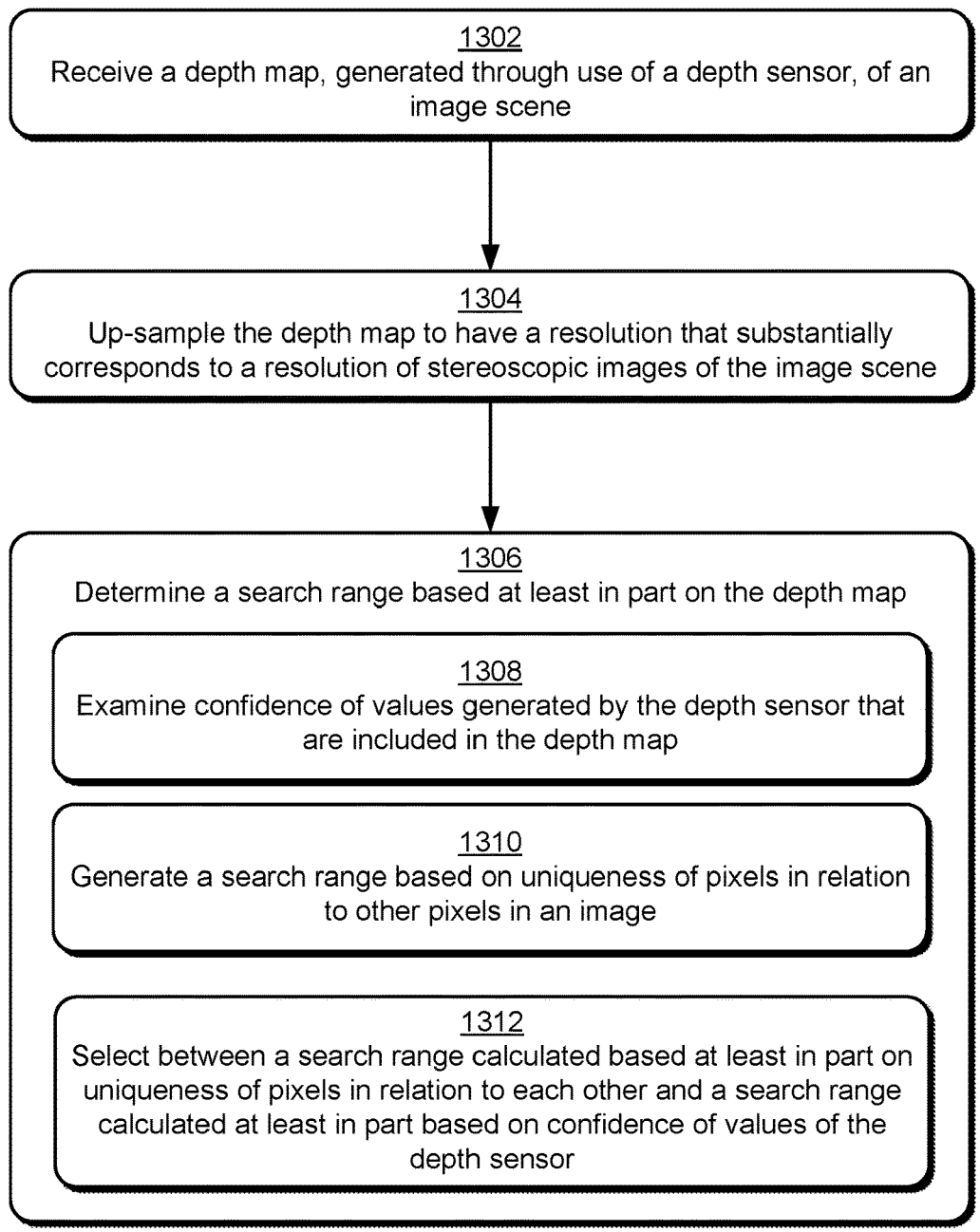
FIG. 13 is a flow diagram depicting a procedure in an example implementation in which a depth map of a depth sensor is used to define a search range for stereo correspondence.

FIG. 13 depicts a procedure 1300 in an example implementation in which a depth map output by a depth sensor is utilized to determine a search range that is to be used for calculating stereo correspondence of stereoscopic images. A depth map is received that is generated through use of a depth sensor of an image scene (block 1302). As previously described, this depth map 120 may be configured in a variety of ways to describe relative depths at different coordinates in an image scene 202.

In some instances, the depth map may have a resolution that is different than a resolution of the images. For example, if the depth map has a lower resolution, the depth map may be up sampled to have a resolution that substantially corresponds to a resolution of stereoscopic images of the image scene (block 1304). Other examples are also contemplated to arrive at resolutions that are consistent between the images and the depth map as well as other examples that involve additional processing of the depth map as previously described.

A search range is determined based at least in part on the depth map (block 1306). For example, confidences of values generated by the depth sensor that are included in the depth map may be examined (block 1308). This may be performed in a variety of ways, such as based on density of values as described above to set a search range based on confidence. In another example, a search range is generated based on uniqueness of pixels in relation to other pixels in an image (block 1310). A red license plate of the car in the image scene 202 of FIG. 2, for instance, may be valued as highly unique in comparison with values of black checks in the checkerboard flag. Thus, this uniqueness score may be used to set a search range accordingly.

A selection may then be made between a search range calculated based at least in part on uniqueness of pixels in relation to each other and a search range calculated at least in part based on confidence of values of the depth sensor (block 1312). A cost calculation module 1022, for instance, may take a minimum of these values. In instances in which the values are zero, a default value may be used, such as a defined maximum search range. The selected search range may then be used in the determination of stereo correspondence, as further described below.

FIG. 14 depicts a procedure 1400 in an example implementation in which a depth map generated by a depth sensor is leveraged in cost calculations to determine stereo correspondence of stereoscopic images. A depth map is received from one or more depth sensors of an image scene, the depth map describing depth of the image scene (block 1402). As before, the depth map 120 may be generated and processed in a variety of ways.

Stereo correspondence is calculated using image data of stereoscopic images of the image scene, which is performed based at least in part on the determined search range and the depth map (block 1404). The determined search range from FIG. 14, for instance, may be used to perform the calculation, which may improve efficiency and accuracy.

The depth map may also be used directly as part of the stereo correspondence calculation. For example, a data cost may be calculated based on a set of known disparities around a fixed neighborhood of a pixel, the set of known disparities indicated by the depth map (block 1406). In another example, a smoothness cost may be calculated based at least in part on guided filtering performed using a respective one of the stereoscopic images and the depth map (block 1408). As shown in FIG. 6, for instance, this may be used to suppress image edges that do not correspond to depth discontinuities. A variety of other examples are also contemplated without departing from the spirit and scope thereof.

Example System and Device

Figure 15:
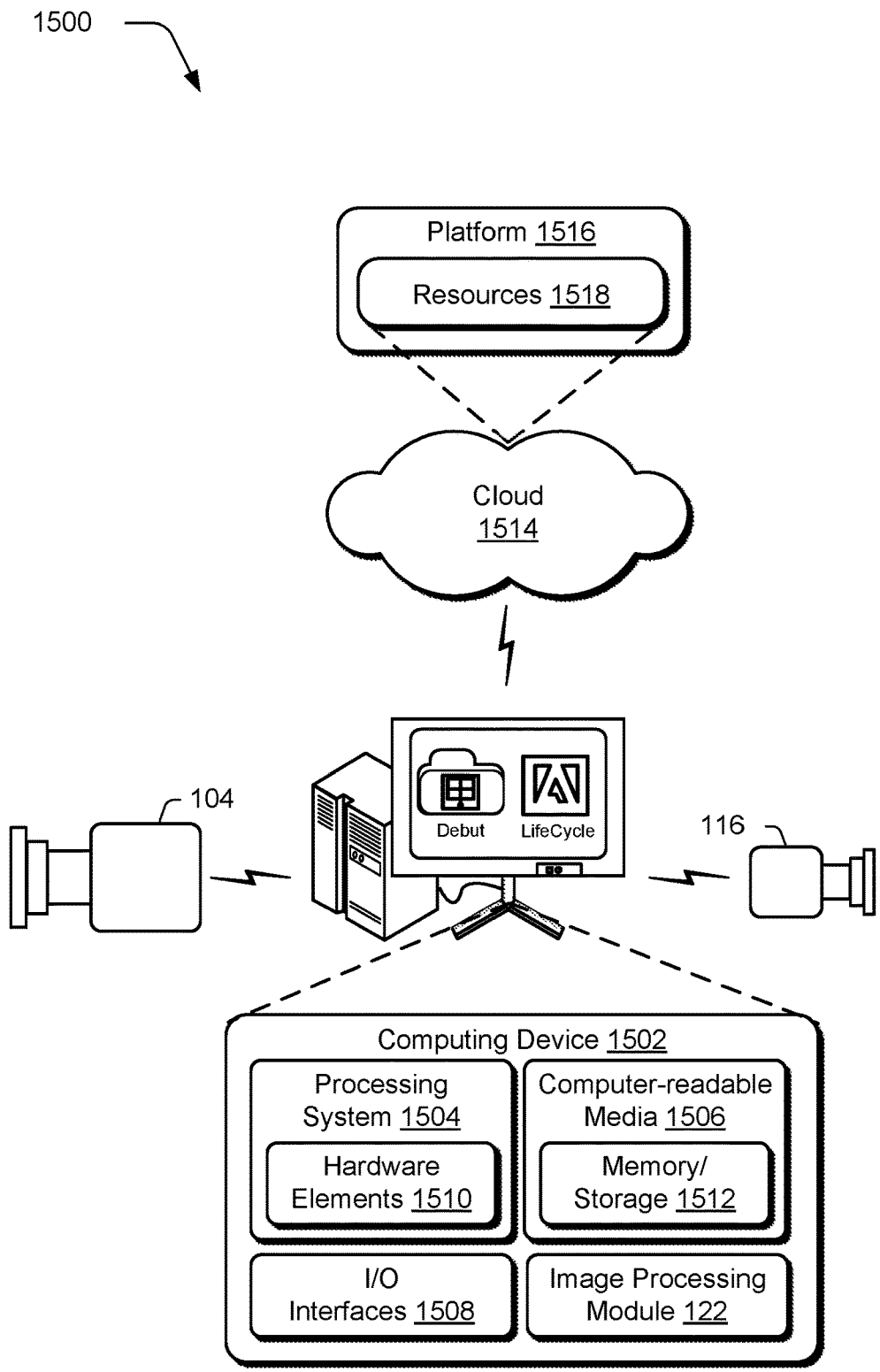
FIG. 15 illustrates an example system including various components of an example device that can be implemented as any type of computing device as described and/or utilize with reference to FIGS. 1-14 to implement embodiments of the techniques described herein.

FIG. 15 illustrates an example system generally at 1500 that includes an example computing device 1502 that is representative of one or more computing systems and/or devices that may implement the various techniques described herein. This is illustrated through inclusion of the image processing module 122, which may be configured to process image data, such as image data captured by an image capture device 104 as well as a depth map from the depth sensors 116. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   receiving stereoscopic images of an image scene;
   detecting depth values at locations of the image scene;
   generating, from the detected depth values, a depth map identifying depth discontinuities;
   identifying image edges in the stereoscopic images based on characteristics of pixels from the stereoscopic images;
   determining image edge correspondence by comparing image edges identified from the stereoscopic images with depth discontinuities identified using the depth map;
   calculating stereo correspondence by using the depth map generated from the detected depth values, in conjunction with the stereoscopic images;
   suppressing image edges identified from the stereoscopic images that do not correspond to depth discontinuities identified using the depth map, by removing image edges that do not correspond to depth discontinuities from the stereo correspondence calculation; and
   generating, using the calculated stereo correspondence, a version of the image scene that includes the image edges that do correspond to depth discontinuities and are not suppressed.

2. A method as described in claim 1, wherein the determining image edge correspondence is performed at least in part based on a difference in disparity values calculated using the depth map.

3. A method as described in claim 1, further comprising aligning at least one of the depth discontinuities to a corresponding one of the image edges.

4. A method as described in claim 3, wherein the aligning includes displacing the at least one of the depth discontinuities from coordinates indicated by the depth map to coordinates associated with the corresponding one of the image edges.

5. A method as described in claim 1, further comprising calibrating the stereoscopic images in two dimensions.

6. A method as described in claim 1, wherein the determining includes weighting the image edges based on correspondence to the depth discontinuities.

7. A method as described in claim 1, further comprising receiving the stereoscopic images from first and second image capture devices and generating the depth map using one or more depth sensors, separate from the first and second image capture devices, configured to detect depth values at locations of the image scene.

8. A method as described in claim 7, wherein the first and second image capture devices are part of a stereoscopic camera.

9. A method as described in claim 7, wherein the generating of the depth map is performed using a depth sensor configured as a time of flight camera, laser depth sensor, a projector camera device, a structured light device, or range camera.

10. A method as described in claim 1, wherein characteristics of pixels from the stereoscopic images are texture and color.

11. A method implemented by one or more computing devices, the method comprising:
receiving stereoscopic images of an image scene;
determining image edge correspondence by projecting a depth map onto the stereoscopic images and comparing image edges identified from the stereoscopic images with depth discontinuities identified using the depth map;
classifying image edges as corresponding to the depth discontinuities or as not corresponding to the depth discontinuities;
suppressing image edges from the stereoscopic images that do not correspond to depth discontinuities indicated by the depth map of the image scene;
aligning the corresponding one or more depth discontinuities to at least one image edge that is not suppressed; and
generating a representation of the image scene that includes the at least one image edge using the aligned depth discontinuities and that includes the image edges that do correspond to depth discontinuities and are not suppressed.

12. A method as described in claim 11, further comprising identifying the image edges based on textures and features of the stereoscopic images.

13. A method as described in claim 11, wherein the aligning includes displacing the one or more depth discontinuities from coordinates indicated by the depth map to coordinates associated with the corresponding at least one image edge.

14. A method as described in claim 13, further comprising calibrating the stereoscopic images in two dimensions.

15. A method as described in claim 13, further comprising calculating stereo correspondence of the image data of the stereoscopic images based at least in part on the aligned image edges.

16. One or more computer-readable storage media comprising instructions that are stored thereon that, responsive to execution by a computing device, causes the computing device to perform operations comprising:
receiving stereoscopic images of an image scene;
determining correspondence of at least one image edge to one or more depth discontinuities indicated by a depth map of the image scene;
suppressing image edges from the stereoscopic images that do not correspond to depth discontinuities indicated by the depth map of the image scene by performing one or more of removing the image edges that do not correspond to the depth discontinuities, or weighting the image edges that do not correspond to the depth discontinuities;
aligning the corresponding one or more depth discontinuities to the determined at least one image edge; and
generating a representation of the image scene that includes the at least one image edge using the aligned depth discontinuities and that includes the image edges that do correspond to depth discontinuities and are not suppressed, said generating further including one or more of removing or weighting the image edges that do not correspond to the depth discontinuities in the representation of the image scene.

17. One or more computer-readable storage media as described in claim 16, further comprising identifying the image edges based on textures and features of the stereoscopic images.

18. One or more computer-readable storage media as described in claim 16, wherein the aligning includes displacing the one or more depth discontinuities from coordinates indicated by the depth map to coordinates associated with the corresponding at least one image edge.

19. One or more computer-readable storage media as described in claim 16, further comprising calibrating the stereoscopic images in two dimensions.

20. One or more computer-readable storage media as described in claim 16, further comprising calculating stereo correspondence of the image data of the stereoscopic images based at least in part on the aligned image edges.

* * * * *